United States Patent [19]

Reeve et al.

[11] Patent Number: 5,535,393
[45] Date of Patent: Jul. 9, 1996

[54] SYSTEM FOR PARALLEL PROCESSING THAT COMPILES A FILED SEQUENCE OF INSTRUCTIONS WITHIN AN ITERATION SPACE

[76] Inventors: Christopher L. Reeve, 18 Salisbury Rd., Brookline, Mass. 02146; Tani Shavit, One Seaborn Pl., Lexington, Mass. 02173; James B. Rothnie, Jr., 47 Monmouth St., Brookline, Mass. 02146; Timothy G. Peters, 11 Wilbur St., Waltham, Mass. 02154; Linda Q. Lee, 28 Hurlbut St., Cambridge, Mass. 02138; William F. Mann, 23 Checkerberry Cir., Sudbury, Mass. 01776; Jacklin Kotikian, 540 Barrett's Mill Rd., Concord, Mass. 01742

[21] Appl. No.: 461,178

[22] Filed: Jun. 5, 1995

Related U.S. Application Data

[63] Continuation of Ser. No. 763,507, Sep. 20, 1991, abandoned.

[51] Int. Cl.[6] ........................................... G06F 9/06
[52] U.S. Cl. .................... 395/700; 395/600; 364/DIG. 1; 364/280.4; 364/280.5; 364/280.6
[58] Field of Search ...................................... 395/600, 700

[56] References Cited

U.S. PATENT DOCUMENTS

| | | | |
|---|---|---|---|
| 3,723,976 | 3/1973 | Alvarez et al. | 395/417 |
| 3,800,291 | 3/1974 | Cocke et al. | 395/412 |
| 4,358,823 | 11/1982 | McDonald | 395/182.09 |
| 4,410,944 | 10/1983 | Kronies | 395/474 |
| 4,468,733 | 8/1984 | Oka et al. | 395/306 |
| 4,476,524 | 10/1984 | Brown et al. | 395/306 |
| 4,488,256 | 12/1984 | Zolnowsky et al. | 395/420 |
| 4,497,023 | 1/1985 | Moorer | 395/775 |
| 4,622,631 | 11/1986 | Frank et al. | |
| 4,730,249 | 5/1988 | O'Quin, II et al. | 395/700 |
| 4,758,946 | 7/1988 | Shar et al. | 395/416 |
| 4,768,144 | 8/1988 | Winter et al. | 395/600 |
| 4,780,873 | 10/1988 | Mattheyses | |
| 4,792,895 | 12/1988 | Tallman | 395/375 |

(List continued on next page.)

FOREIGN PATENT DOCUMENTS

| | | |
|---|---|---|
| 0211613 | 2/1987 | European Pat. Off. . |
| 0233993 | 9/1987 | European Pat. Off. . |
| 0262750 | 4/1988 | European Pat. Off. . |
| 0322117 | 6/1989 | European Pat. Off. . |
| 0322116 | 6/1989 | European Pat. Off. . |
| 0404559 | 12/1990 | European Pat. Off. . |
| 0404560 | 12/1990 | European Pat. Off. . |
| 2176918 | 1/1987 | United Kingdom . |
| WO88/08652 | 11/1988 | WIPO . |

OTHER PUBLICATIONS

Ouyang, "Execution of Regular DO Loops on Asynchronous Multiprocessors," Proc. of the Fifth Int'l Parallel Processing Symposium, 30 Apr.–2 May 1991, pp. 605–610.

Kulkarni et al, "Loop Partitioning Unimodular Transformations for Distributed Memory Multiprocessors", Proc. of the Fifth Int'l Parallel Processing Symposium, 30 Apr.–2 May 1991, pp. 599–604.

Wang et al, "Compiler Techniques to Extract Parallelism within a Nested Loop", Proc of the Fifteenth Annual Int'l Computer Software and Applications Conference, 11–13 Sep. 1991, pp. 24–29.

Uffenbeck, "Microcomputers and Microprocessors" (Prentice Hall, 1985), Sec. 6.5–7.4, pp. 257–332.

(List continued on next page.)

Primary Examiner—Thomas G. Black
Assistant Examiner—Wayne Amsbury

[57] ABSTRACT

An improved parallel processing apparatus and method executes an iterative sequence of instructions by arranging the sequence into subtasks and allocating those subtasks to processors. This division and allocation is conducted in such a manner as to minimize data contention among the processors and to maximize the locality of data to them. The improved apparatus and method have application to a variety of multiprocessor systems, including those which are massively parallel.

72 Claims, 8 Drawing Sheets

U.S. PATENT DOCUMENTS

| | | | |
|---|---|---|---|
| 4,864,495 | 9/1989 | Inaba | 395/250 |
| 4,888,726 | 12/1989 | Struger et al. | 395/200.03 |
| 4,928,224 | 5/1990 | Zulian | 395/309 |
| 4,930,106 | 5/1990 | Danilenko et al. | 365/189.01 |
| 4,972,338 | 12/1990 | Crawford | 395/416 |
| 4,980,816 | 12/1990 | Fukuzawa et al. | 395/417 |
| 5,025,365 | 6/1991 | Mathur et al. | 395/600 |
| 5,055,999 | 10/1991 | Frank et al. | 395/490 |
| 5,060,186 | 10/1991 | Barbagelata et al. | 395/402 |
| 5,067,071 | 11/1991 | Schanin et al. | 395/293 |
| 5,101,402 | 3/1992 | Chiu et al. | 370/17 |
| 5,101,485 | 3/1992 | Perazzoli, Jr. | 395/416 |
| 5,119,481 | 6/1992 | Frank et al. | 395/280 |
| 5,136,717 | 8/1992 | Morley et al. | 395/800 |
| 5,212,773 | 5/1993 | Hillis | 395/200 |
| 5,226,109 | 7/1993 | Dawson et al. | 395/120 |
| 5,226,175 | 7/1993 | Deutsch et al. | 395/119 |
| 5,230,053 | 7/1993 | Zaiki | 395/700 |
| 5,251,308 | 10/1993 | Frank et al. | 395/425 |
| 5,282,201 | 1/1994 | Frank et al. | 370/94.1 |
| 5,297,265 | 3/1994 | Frank et al. | 395/400 |

OTHER PUBLICATIONS

Software–Practice And Experience, vol. 18(8), 713–732 (Aug. 1988), Bershad et al., "Presto: A System for Object-oriented Parallel Programming".

Wolfe, *Optimizing Supercompilers for Supercomputers*, (1989) The MIT Press.

Wolfe and Banerjee, *International Journal of Parallel Programming*, (1987), vol. 16, No. 2, pp. 137–178, "Data Dependence and Its Application for Parallel Processing".

Padua and Wolfe, Communications of the ACM, (1986), vol. 29 No. 12, pp. 1184–1201, "Advanced Compiler Optimizations for Supercomputers".

Ramanujam and Sadayappan, *Communications of the ACM*, (1991), "Tiling Multidimensional Iteration Spaces for Nonshared Memory Machines", pp. 111–120.

Wolfe et al., "More Interaction Space Tiling" *Proceedings Supercomputing* '89, pp. 655–664, Nov. 13–17, 1989, Reno, Nevada, Sponsored by IEEE Computer Society and ACM SIGARCH, ACM Order No. 415892.

Li et al., "Compiling Communication–Efficient Programs for Massively Parallel Machines" *IEEE Transactions on Parallel and Distributed Systems*, vol. 2, No. 3, pp. 361–376, Jul. 1991.

Midkiff et al., "Architectural Support for Interprocessor Communication in Point–to–Point Multiprocessor Networks" *Proceedings of the 6th Annual Phoenix Conference on Computers and Communications*, 25–27 Feb. 1987, pp. 14–17.

European Search Report issued during prosecution of EP 92 308 406.5, mailed Apr. 15, 1993.

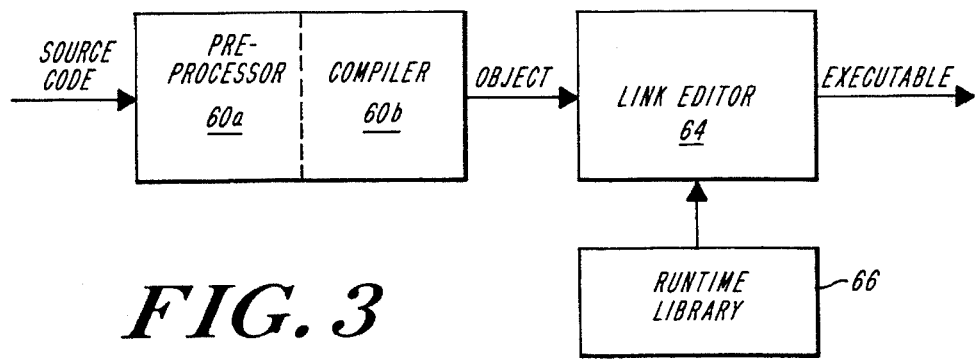

*FIG. 3*

| TILABLE? | RESTRICTION | OBSTACLE | DECISION |
|---|---|---|---|
| <idx> YES/NO | ["IMPERFECT"][<idx>,...] | | [<MESSAGE>] |
| ... | | | |

*FIG. 4A*

| | TILABLE? | RESTRICTION | OBSTACLE | DECISION |
|---|---|---|---|---|
| k | NO | | – CARRIES CYCLE DEPENDENCE CAUSED BY VARIABLE a | NOT-TILED |
| | | j | (r)– BOUNDS OF LOOP j DEPEND ON THE LOOP-INDEX OF k | |
| | | i | (r)– BOUNDS OF LOOP i DEPEND ON THE LOOP-INDEX OF k | |
| j | YES | k | | TILED |
| i | YES | k | | TILED |

*FIG. 4B*

| | TILABLE? | RESTRICTION | OBSTACLE | DECISION |
|---|---|---|---|---|
| i | YES | – | | TILED |
| j | YES | "IMPERFECT" | (r) LOOPS j AND k ARE IMPERFECTLY NESTED | TILED |
| k | YES | – | | NOT-TILED |

*FIG. 4C*

| | TILABLE | RESTRICTION | OBSTACLE | DECISION |
|---|---|---|---|---|
| l | YES | | | TILED |
| k | YES | j | (r)BOUNDS OF LOOP i DEPEND ON LOOP-INDEX k | TILED |
| j | YES | | | TILED |
| i | YES | k | (r)BOUNDS OF LOOP i DEPEND ON LOOP-INDEX k | NOT-TILED |
*FIG. 4D*
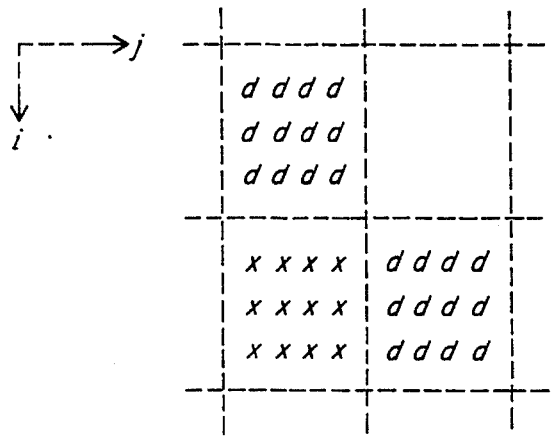
*FIG. 8*
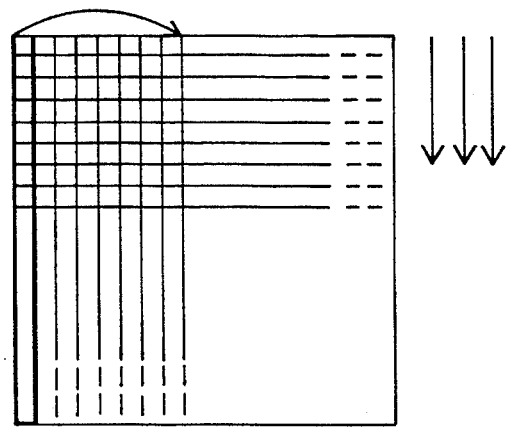
*FIG. 9A*
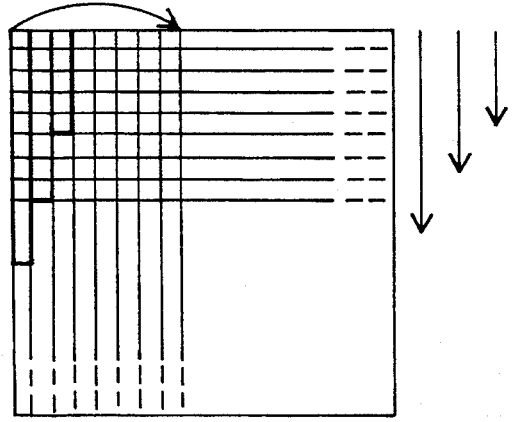
*FIG. 9B*

| DIRECTIVES AND ASSERTIONS ||| 
| DIRECTIVE / ASSERTION | SCOPE | WAS (REF[1]) |
|---|---|---|
| TILING DIRECTIVES | | |
| - | | COLLAPSE (1-99) |
| - | | MINTILE (>=0) |
| [NO] AUTOTILE [(<LEVEL>)] | UNTIL RESET | NO TILE (ON/OFF) |
| [NO] TILE [(<TILING-ARGS>)] | LOOPNEST | - |
| | | |
| OPTIMIZATION DIRECTIVES | | |
| [NO] DUST [(<LEVEL>)] | UNTIL RESET | DUST (0-3) |
| [NO] INTERCHANGE | UNTIL RESET | |
| MAX TILING DEPTH (<LEVEL>) | UNTIL RESET | LIMIT (>=0, [,0-2000]) |
| -(FUNCTIONALITY ADDED TO AUTOTILE) | | OPTIMIZE (0-5) |
| [NO] ROUNDOFF [(<LEVEL>)] | UNTIL RESET | SAME |
| - | | UNROLL (<#IT. [<WEIGHT>]) |
| | | |
| FORTRAN LANGUAGE DIRECTIVES | | |
| [NO] EXPAND ROUTINE (...) | UNTIL RESET | EXPAND ROUTINE (...)(ON/OF) |
| | | |
| ASSERTION DIRECTIVE | | |
| [NO] ASSERTIONS | UNTIL RESET | ASSERTIONS (ON/OF) |
| | | |
| ASSERTIONS | | |
| - | | ASSERT DO (SERIAL) |
| - | | ASSERT DO (TITLE) |
| - | | ASSERT DO PREFER (SERIAL) |
| - | | ASSERT DO PREFER (TITLE) |
| -(FUNCTIONALLY INCLUDED IN PARALLEL ROUTINES) | | ASSERT [NO] SIDE EFFECTS |
| ASSERT [NO] ARGUMENT HAZARD | UNTIL RESET | ASSERT [NO] ARGUMENT ALIASING |
| ASSERT DISTINCT (<VARIABLE-LIST>) | LOOPNEST | ASSERT PERMUTATION (<NAME>) |
| ASSERT [NO] EQUIVALENCE HAZARD | UNTIL RESET | SAME |
| ASSERT IGNORE ANY DEPENDENCE(S) [(<VARIABLE-LIST>)] | LOOPNEST | ASSERT NO RECURRENCE (<NAME>) |
| ASSERT IGNORE ASSUMED DEPENDENCE(S) [(<VARIABLE-LIST>)] | LOOPNEST | - |
| ASSERT IGNORE CALL(S) [(<NAME-LIST>)] | LOOPNEST | ASSERT CONCURRENT CALL |
| ASSERT IGNORE LAST VALUE(S) [(<VARIABLE-LIST>)] | LOOPNEST | [NO] LAST VALUE |
| ASSERT PARALLEL ROUTINE(S) [(<NAME-LIST>)] | UNTIL RESET | - |
| ASSERT (<LOGICAL-EXPRESSION>) | LOOPNEST | ASSERT RELATIONS (...) |

FIG. 5

| PARAM | DEFAULT | DESCRIPTION |
|---|---|---|
| PL_STRATEGY | MOD,SLICE | GRAB: GRAB STRATEGY, MOD: MODULE STRATEGY, WAVE: WAVEFRONT STRATEGY, SLICE: SLICE STRATEGY, NONE: UNSETS STRATEGY VALUE |
| PL_INFO | 0 | CONTROLS PRINT OF PRESTO'S START/END INFORMATION. IF 1, START AND ENDING INFORMATION IS PRINTED |
| PL_NUM_THREADS | 0 | NUMBER OF THREADS PRESTO USES TO POPULATE THE INITIAL IDLE POOL, AND THE DEFAULT NUMBER USED TO EXECUTE TILE FAMILIES. IF NOT SET BY THE USER, THIS NUMBER IS EQUAL TO THE NUMBER OF CELLS IN THE PROCESSOR SET. |
| PL_STATISTICS | 0 | WHEN 1, PRESTO KEEPS STATISTICS ON PROGRAM PERFORMANCE. |
| PL_LOG | 0 | WHEN 1, PRESTO KEEPS LOG OF WORK DONE BY DIRECTIVES |
| PL_VISUAL | 0 | WHEN 1, PRESTO GENERATES INPUT FOR VISUALIZATION PROGRAM |
| PL_SYNC_DELAY | 400 | TUNING VALUE FOR SYNCHRONIZATION PRIMITIVES. |
| PL_MIN_INST_PER_TILE | 0 | MINIMUM NUMBER OF INSTRUCTIONS PER TILE. USED AS A REQUIREMENT WHEN CALCULATING TILE SIZE. CAN BE MANIPULATED TO AFFECT PRESTO'S TILE SIZING CALCULATIONS. |
| PL_ONE_SP_LONG | 16 | USED BY PRESTO WHEN CALCULATING TILE SIZE. THIS IS THE INCREMENT USED TO STRETCH A TILE DIMENSION WITH A SSB VALUE OF SSB_NONE. CAN BE MANIPULATED IF USER WISHES TO AFFECT THE WAY PRESTO TO INCREASES TILE SIZE. |
| PL_TWO_SP_LONG | 16 | USED BY PRESTO WHEN CALCULATING TILE SIZE. THIS IS THE INCREMENT USED TO STRETCH A TILE DIMENSION WITH A SSB VALUE OF SSB_SP, OR TO STRETCH TILES UNDER THE WAVEFRONT STRATEGY. CAN BE MANIPULATED IF USER WISHES TO AFFECT THE WAY PRESTO TO INCREASES TILES SIZE. |

*FIG. 6A*

| PARAM | DEFAULT | DESCRIPTION |
|---|---|---|
| PL_DB | 0 | FLAG FOR DEBUG MESSAGES, TO BE USED BY THE DEVELOPERS ONLY. |
| PL_PT_LOG | 0 | FLAG TO TURN ON PTHREAD LOGGING, TO BE USED BY THE DEVELOPERS ONLY. |

*FIG. 6B*

```
        PARAMETER (n=100)
        COMMON / AR / A(n)
                DO 10 I = 1, n
                DO 10 J = 1, n         ── 70A
                    A(I,J) = 0.0
                10 CONTINUE
                END
```

```
        SUBROUTINE FOO (A,n)           ── 70B
            COMMON / AR / A(n,n)
            C *KSR*TILE (I,J) ──────────── A ──── C
                DO 10 I = 1, n
                DO 10 J = 1, n
                    A(I,J) = 0.0
                10 CONTINUE
            C  KSR  END TILE ─────────────── B ──
                END

PARAMETER (n = 100)
            COMMON / AR / A(n)                    ── 70C

TASK FOO $1 (I1, I2, J1, J2) ←──── A
                DO 10 I = I1, I2
                DO 10 J = J1, J2
                    A(I,J) = 0.0
            10      CONTINUE
                END TASK ←────────────────── B

CALL_PR_EXECUTE_TILES (< FOO-$1-TILE-
        FAMILY-PARAMS >..., ) ←──────────── C

END
```

*FIG. 7*

SYSTEM FOR PARALLEL PROCESSING THAT COMPILES A FILED SEQUENCE OF INSTRUCTIONS WITHIN AN ITERATION SPACE

This application is a continuation of U.S. patent application Ser. No. 07/763,507 filed on Sep. 20, 1991 Entitled: PARALLEL PROCESSING APPARATUS AND METHOD FOR UTILIZING TILING, assigned to the assignee hereof, now abandoned.

BACKGROUND OF THE INVENTION

The invention relates to digital data processing and, more particularly, to methods and apparatus for executing programs on parallel processing computers.

Early computers typically relied on a single processing unit, or CPU, to perform processing functions. Source code programs written for those computers were translated into a sequence of machine instructions which were then executed one-by-one by the CPU. Where repetitive sequences of steps, or loops, existed in the original program, the single processor would take up each instruction in the loop, one at a time, and repeat those same instructions for each iteration of the loop.

A later advance made it possible to execute some sets of instructions "in parallel" with one another. This advance, referred to as co-processing, provided alongside the CPU a special purpose processor. Execution of programs on such a machine was thus divided between the coprocessor and the CPU.

With the advent of computers with multiple processors, it became possible to allocate entire tasks to separate concurrently operating CPU's. A special class of these multiprocessors, referred to as parallel processors, are equipped with special synchronizing mechanisms and thus are particularly suited for concurrently executing portions of the same program.

"Parallelizing" execution of computer programs so that they can be run efficiently on parallel processors is a daunting task. First, the data-flow and control-flow of the program must be understood and, then, rearranged to define a set clearly divisible tasks. The most significant gains attained to date have been in the rearrangement of loop execution, i.e., "loop interchange," synchronization and (to a limited degree) tiling.

Although much parallelization work is done by hand, recent inroads have been made into automating that task. This is typically performed in connection with the compilation process, which converts the source code program into machine code. One commercially available product, the KAP/KAI Preprocessor available from Kuck and Associates, Inc., of Illinois, performs some of these functions. Particularly, that preprocessor provides capabilities for loop interchange and synchronization.

In view of the foregoing, an object of this invention is to provide improved digital data processing apparatus and methods.

More particularly, an object is to provide an improved mechanism for executing programs on parallel processing computers, including those which are massively parallel.

Still another object is to provide an improved compiler for facilitating parallelization of computer programs.

Yet another object is to provide a computer run-time mechanism for parallelizing and executing a computer program on a multiprocessor system.

SUMMARY OF THE INVENTION

These objects are attained by the invention which provides an improved parallel processor for executing an iterative sequence of instructions by arranging the sequence into subtasks and allocating those to the processors. This division and allocation is conducted in such a manner as to minimize data contention among the processors and to maximize locality of data to the processors which access that data.

In one aspect, the invention provides an improved parallel processor of the type having a plurality of processing units, each for executing instructions; a memory for storing data and instructions; and a mechanism for facilitating communication between the processors. The memory can itself include a plurality of memory elements, each capable of storing data and instructions. The communication mechanism can be, for example, a signalling protocol using common areas of memory.

The improvement is characterized, in part, by storing a tiled sequence of instructions, representing the iterative sequence, in memory. Further, each processor signals its availability to execute a portion of the tiled sequence. Still further, a next-tile element responds to that signalling by generating a signal representing the boundaries of a "tile"—that is, a portion of an iteration space associated with the iterative sequence. The signalling processor then executes the tiled sequence over that tile.

The tiles generated by the next-tile element do not overlap one another; however, all the tiles together cover the iteration space. As noted above, these tiles are generated so as to minimize contention for data between the processors, while maximizing the locality of data to them.

A parallel processor as describe above can include a tile-builder that generates a tile-shape signal defining the dimensions within the iteration space of the tiles. For example, an iteration space may be defined by the indices (i) and (j); where (i) ranges from 1 to 100, and where (j) ranges from 1 to 25. A tile for such a space may be defined to cover 16 increments along (i) and 25 increments along (j). Thus, dividing the iteration space into 6 tiles of equal size (i.e., 16 increments), and one of smaller tile (i.e., of 4 increments) at the edge.

The tile-builder generates the tile-shape signal in view of the dependencies which will exist between the resultant tiles. Dependency in this regard is an inter-tile characteristic referring to the relationship between them with respect to the data they access so that the serial execution order is preserved whenever it matters. For example, if first tile must write a datum before it can be read by a second tile, then that second tile is said to depend on the first.

More particularly, data dependency exists between two tiles where i) an instruction in the first tile writes a selected datum, which an instruction in the second tile subsequently reads, ii) an instruction in the first tile reads a selected datum, which an instruction in the second tile that subsequently writes, or iii) an instruction in the first tile writes a selected datum, which an instruction in the second tile also subsequently writes.

A more complete understanding of dependency itself may be obtained by reference to Wolfe, *Optimizing Supercompilers for Supercomputers* (The MIT Press, 1989).

The tile-builder optimizes, among other things, memory utilization. For example, it can choose a tile shape that minimizes the number of individual datum subject to write-type access by different ones of the tiles to minimize data movement. Further, to minimize contention, it can choose the tile shape that minimizes the number of individual datum subject to write-type access by plural concurrently-executing tiles.

In another aspect, the tile-builder of a parallel processor as described above generates an "affinity" signal (or "ssb") representing a sequence for tile execution that minimizes the transfer of a data between processors.

The tile shape is generated as a function of at least a dependency direction of the tiles; an affinity signal (ssb); an estimate of the cost (e.g., the number of machine cycles) of executing the tiles; the size of the iteration space; the number of processors available for execution of the tiled sequence; and whether the tiles lie within an "affinity region"—that is, a region of the program where the iteration space defined by a plurality of tile sequences, rather than by a single one.

In yet another aspect, a parallel processor according to the invention includes a tile-strategy element that selects a manner and sequence for generating tiles from among a set of strategies. The tile-strategy element generates a corresponding signal to which the next-tile element responds in producing tiles.

A "slice" strategy divides the iteration space by the number of available processors. One each of these tiles are assigned to a respective one of the processors. Thus, if there are 10 processors, there will be 10 tiles: the first tile will be assigned to the first processor, the second tile to the second processor, and so forth.

This strategy is chosen when there is no data dependency between the resultant tiles. As well as when there is little affinity between them—that is, when little data accessed (whether for reads or writes) by any one of them is also accessed by another.

A "modulo" strategy divides the iteration space into a number of tiles which can be greater than the number of available processors, and assigns the resulting tiles based on the modulus of the tile number. Thus, for example, if there are 3 available processors and 9 tiles, regardless of their timing of availability, the first processor will be assigned tiles 1, 4 and 7; the second processor, tiles 2, 5 and 8; and the third processor, tiles 3, 6 and 9

This strategy is also selected when there is no dependence and little affinity between the tiles. Additionally, the strategy is chosen where the resultant tiles and tile assignments will maximize the re-use of data by each of the processors, even if the size of the iteration space changes.

A "wavefront" strategy also divides the iteration space such that there can be more tiles than available processors. It is chosen where the resultant tiles exhibit data dependence and, accordingly, the tiles must be generated in a sequence determined by the dependency direction of the tiles.

By way of example, a first tile may be required to be executed before a second tile and a third tile. Under the wavefront strategy, even if three processors were simultaneously available to take those tiles, only one of them would be given a tile. Particularly, the first tile would be assigned for execution by one processor. Only when that completed could the second and third tiles be executed, relying on the results of execution of the first tile.

A modulo-wavefront strategy divides the iteration space and assigns the tiles in accord with both the modulo and wavefront strategies. This strategy is chosen where there is data dependence between the tiles and where data reuse by the processors can be maximized, again, even in the presence of a change of a size of the iterative space.

A grab strategy too divides the iteration space such that there are more tiles than available processors. The resultant tiles are assigned to requesting processors on a first-come-first-serve basis. Unlike the modulo and wavefront strategies, this strategy is employed where there is no dependence and little affinity between the tiles. It facilitates load-balancing between the processors.

In addition to the conditions discussed above, the tile strategy element can choose any of the foregoing strategies upon demand of the user.

A parallel processor as described above can include an affinity region-build element for defining an iteration space that includes more than one tiled sequence. In addition to generating a signal representing that region, this element can to generate a signal defining tile dimension; a signal defining a sequence and manner for generating tiles; and a signal defining which processors are to execute the tiles.

In yet another aspect, the invention provides an improved compiler of the type for translating a computer program into object code suitable for loading for execution by a plurality of parallel processors.

The improvement is characterized by a tiling element that generates a tiled sequence of instructions representing an iterative sequence in the source program. The tiling element also generates signals providing a framework for use in a parallel processor of the type described above for defining and generating tiles over which to execute the tiled sequence at run-time. In this regard, the tiling element is responsive to the iterative sequence, as well as to user-defined parameters.

In accord with this aspect of the invention, the tiling element can include a parallelizer responsive to the dependency direction of the iterative sequence, as well as to the sequence itself, for choosing indexes in the iteration space over which to execute the tiled sequence. The parallelizer can automatically choose the indices for tiling based on that. While the parallelizer can accept user-defined preferences for those indices, it compares them with the automatically identified ones to insure their viability.

A compiler as defined above can also include an optimizer for generating an affinity signal (ssb) representing a tile execution sequence that minimizes a transfer of data subject to any of read-type or write-type access during execution thereof in plural tiles.

The optimizer can also generate an affinity region signal identifying one or more iteration sequences in the source program that access the same data. While the optimizer too can accept user-defined affinity regions, it compares them with the automatically identified ones to check whether the user-defined regions are reasonable.

In another aspect, the optimizer can determine a cost associated with execution of a tiled sequence and generate a signal representative thereof.

A call-generating element within the compiler can replace the iterative sequence in the source code with an instruction representing a call to a code-dispatching subroutine. A run-time element can execute that call to initiate execution of the tiled sequence by the processors.

This and other aspects of the invention are evident in the drawings and in the description which follows.

BRIEF DESCRIPTION OF THE DRAWINGS

A more complete understanding of the invention may be attained by reference to the drawings, in which:

FIG. 3 depicts the modules utilized for parallelization and execution of software programs including iterative sequences;

FIGS. 4A–4D depict loop tables generated by the preprocessor 60a of FIG. 3;

FIG. 5 presents preferred directives and assertions for preprocessor 60a of FIG. 3;

FIG. 6 depicts runtime environment parameters for use in execution of the system of FIG. 3;

FIG. 7 illustrates the transformation of a tile into a task-subroutine;

FIG. 8 depicts a partial tile ordering by the system of FIG. 3;

FIGS. 9A–9C depict work plans carried out by the system of FIG. 3 to execute a tiled sequence.

DETAILED DESCRIPTION OF THE ILLUSTRATED EMBODIMENT

Figure 1:
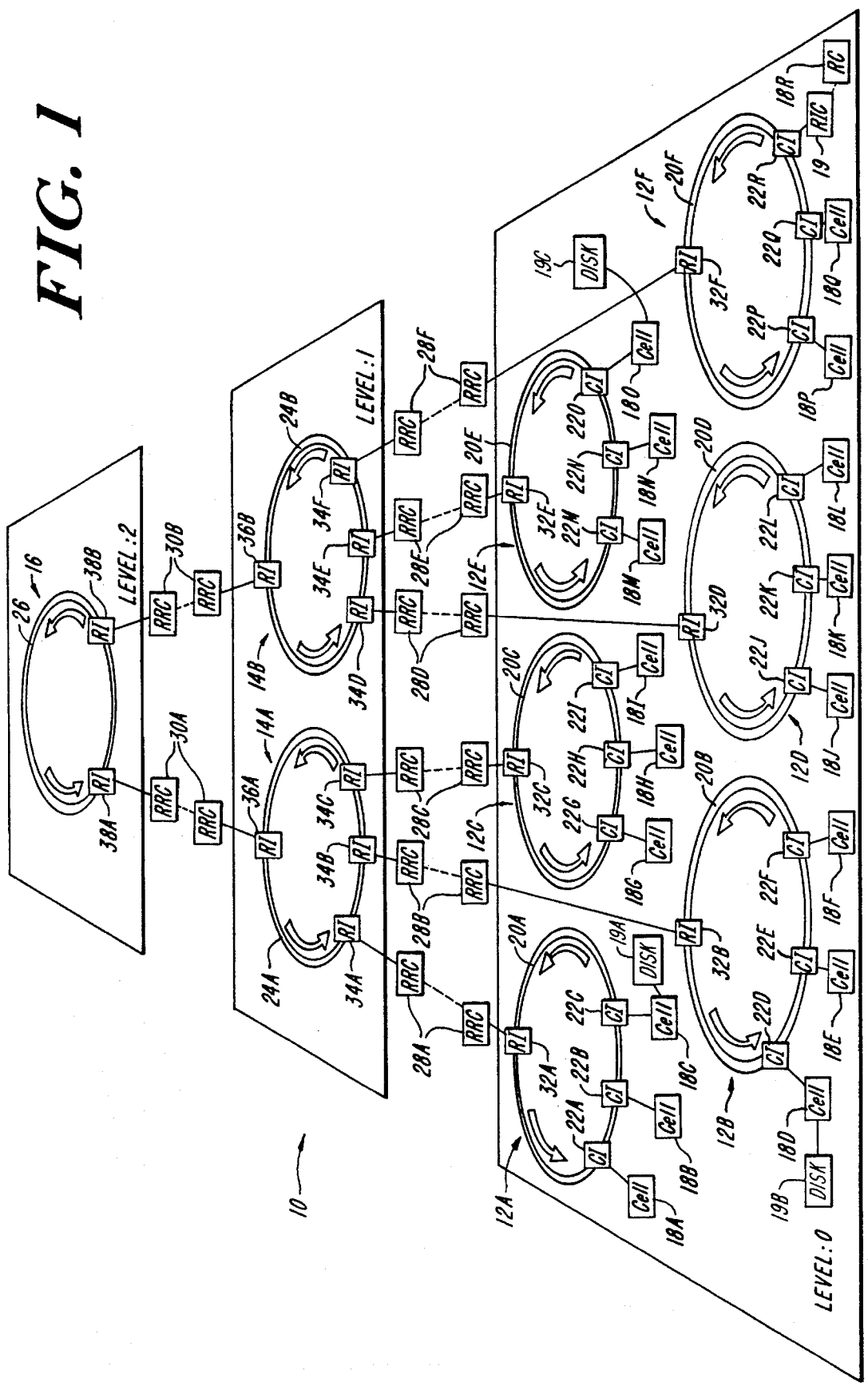
FIGS. 1 and 2 depict the structure of a multiprocessing system for use in a preferred practice of the invention.

FIG. 1 depicts a preferred multiprocessing system used to practice the invention. The illustrated system 10 includes three information transfer levels: level:0, level:1, and level:2. Each information transfer level includes one or more level segments, characterized by a bus element and a plurality of interface elements. Particularly, level:0 of the illustrated system 10 includes six segments, designated 12A, 12B, 12C, 12D, 12E and 12F, respectively. Similarly, level:1 includes segments 14A and 14B, while level:2 includes segment 16.

Each segment of level:0, i.e., segments 12A, 12B, ... 12F, comprise a plurality of processing cells. For example, segment 12A includes cells 18A, 18B and 18C; segment 12B includes cells 18D, 18E and 18F; and so forth. Each of those cells include a central processing unit and a memory element, interconnected along an intracellular processor bus (not shown). In accord with the preferred practice of the invention, the memory element contained in each cells stores all control and data signals used by its associated central processing unit.

Certain cells of the processing system 10 are connected to secondary storage devices. In the illustrated system, for example, cell 18C is coupled with disk drive 19A, cell 18D is coupled with disk drive 19B, and cell 180 is coupled with disk drive 19C. The disk drives 19A–19C are of conventional design and can be selected from any of several commercially available devices. It will be appreciated that secondary storage devices other than disk drives, e.g., tape drives, can also be used to store information.

Figure 2:
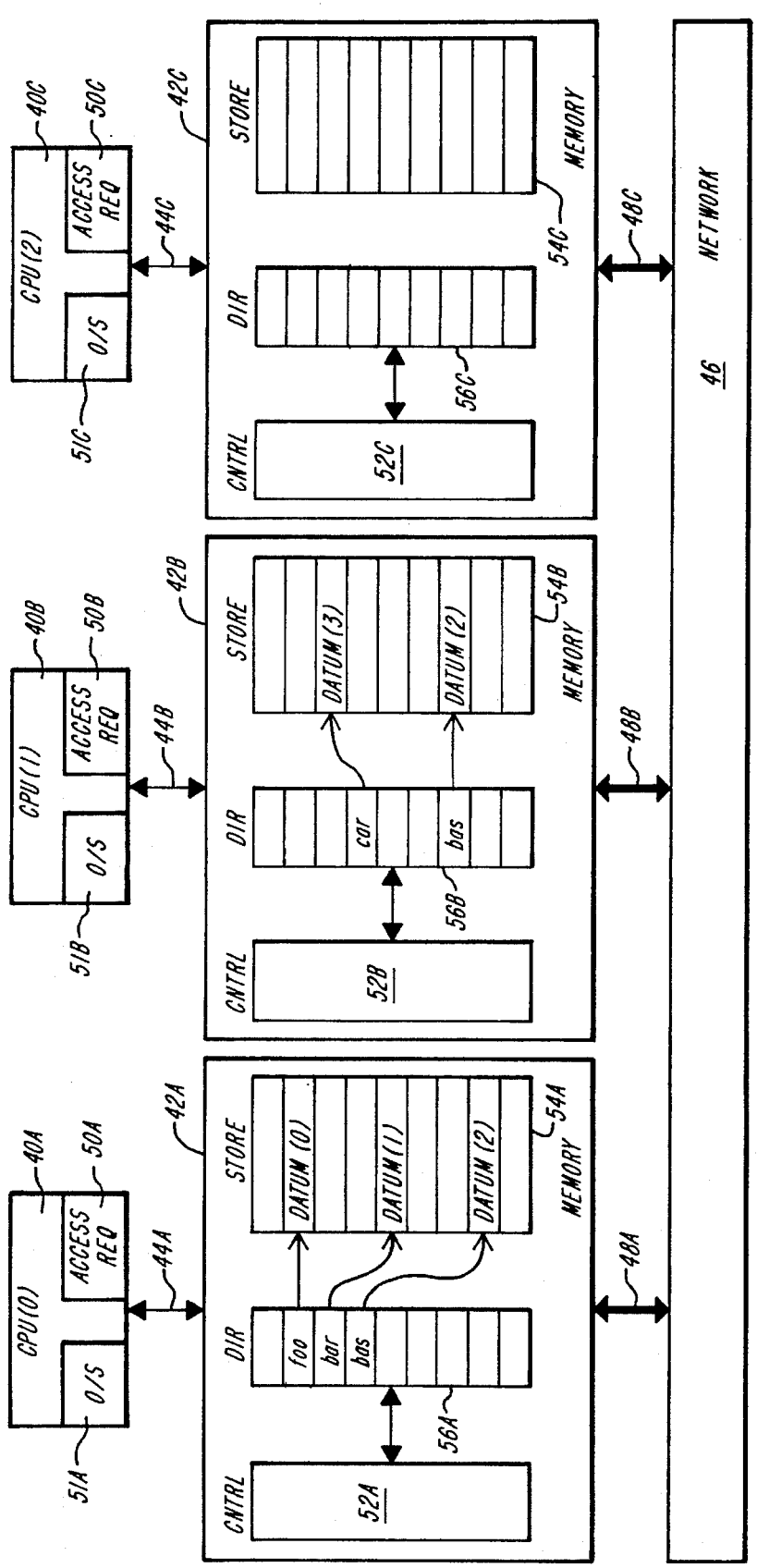

FIG. 2 illustrates in greater detail processing cells and their interconnection within the processing system of FIG. 1. In the drawing, plural central processing units 40A, 40B and 40C are coupled, respectively, to associated memory elements 42A, 42B and 42C. Communications between the processing and memory units of each pair are carried along buses 44A, 44B and 44C, as shown. Network 46, representing the aforementioned level segments and routing cells, transfers information packets (passed to the network 46 over buses 48A, 48B and 48C) between the illustrated processing cells 42A–42C.

In the illustrated embodiment, the central processing units 40A, 40B and 40C each include an access request element, labelled 50A, 50B and 50C, respectively. These access request elements generate requests for access to data stored in the memory elements 42A, 42B and 42C. Among access requests signals generated by elements 50A, 50B and 50C is the ownership-request, representing a request for exclusive, modification access to a datum stored in the memory elements. In a preferred embodiment, access request elements 50A, 50B and 50C comprise a subset of an instruction set implemented on CPU's 40A, 40B and 40C. This instruction subset is described below.

The central processing units 40A, 40B, 40C operate under control of an operating system 51, portions 51A, 51B and 51C of which are resident on respective ones of the central processing units. The operating system 51 provides an interface between applications programs executing on the central processing units and the system 10 facilities, and includes a virtual memory management system for managing data accesses and allocations.

A preferred operating system for controlling central processing units 40A, 40B and 40C is a UNIX-like operating system and, more preferably, OSF/1, modified in accord with the teachings herein.

The memory elements 40A, 40B and 40C include cache control units 52A, 52B and 52C respectively. Each of these cache control units interfaces a data storage area 54A, 54B and 54C via a corresponding directory element 56A, 56B and 56C, as shown. Stores 54A, 54B and 54C are utilized by the illustrated system to provide physical storage space for data and instruction signals needed by their respective central processing units.

A further appreciation of the structure and operation of the illustrated digital data processing system 10 may be attained by reference to the following copending, commonly assigned applications, the teachings of which are incorporated herein by reference:

1) U.S. patent application Ser. No. 07/136,930, filed Dec. 22, 1987, for "MULTIPROCESSOR DIGITAL DATA PROCESSING SYSTEM", now U.S. Pat. No. 5,055,999, Issued Oct. 8, 1991;

2) U.S. patent application Ser. No. 07/696,291, filed May 20, 1991, now U.S. Pat. No. 5,119,481, Issued Jun. 2, 1992;

3) U.S. patent application Ser. No. 07/370,325, filed Jun. 22, 1989, for "MULTIPROCESSOR SYSTEM WITH MULTIPLE INSTRUCTION SOURCES", abandoned May 21, 1993 in favor of U.S. patent application Ser. No. 066,334, filed May 21, 1993;

4) U.S. patent application Ser. No. 07/370,341, filed Jun. 22, 1989, for "IMPROVED MEMORY SYSTEM FOR A MULTIPROCESSOR", now U.S. Pat. No. 5,297,265;

5) U.S. patent application Ser. No. 07/370,287, filed Jun. 22, 1989, for "IMPROVED MULTIPROCESSOR SYSTEM", now U.S. Pat. No. 5,251,308, Issued Oct. 5, 1993;

6) U.S. patent application Ser. No. 07/499,182, filed Mar. 26, 1990, for "HIGH-SPEED PACKET SWITCHING APPARATUS AND METHOD", now U.S. Pat. No. 5,335,325;

7) U.S. patent application Ser. No. 07/521,798, filed May 10, 1990, for "DYNAMIC PACKET ROUTING NETWORK", now U.S. Pat. No. 5,282,201, Issued Jan. 25, 1994;

8) U.S. patent application Ser. No. 07/526,396, filed May 18, 1990, for "PACKET ROUTING SWITCH", now U.S. Pat. No. 5,226,039, Issued Jul. 6, 1993;

9) U.S. patent application Ser. No. 07/531,506, filed May 31, 1990, for "DYNAMIC HEIRARCHICAL ASSOCIATIVE MEMORY", now U.S. Pat. No. 5,341,483;

10) U.S. patent application Ser. No. 07/763,368, filed Sep. 20, 1991, for "DIGITAL DATA PROCESSOR WITH IMPROVED PAGING", now abandoned;

11) U.S. patent application Ser. No. 07/763,505, filed Sep. 20, 1991, for "DIGITAL DATA PROCESSOR WITH IMPROVED CHECKPOINTING & FORKING", issued as U.S. Pat. No. 5,313,647; and 12) U.S. patent application Ser. No. 07/763,132, filed Sep. 20, 1991, for "IMPROVED DIGITAL DATA PROCESSOR WITH DISTRIBUTED MEMORY SYSTEMS, now abandoned."

Code Parallelization & Execution

FIG. 3 depicts a preferred arrangement of software modules utilized in digital data processor for parallelization and execution of software programs including iterative sequences. A compilation system 60 translates source code input into object code. The source code can be of conventional format, e.g., Fortran 77 or Fortran 90, or C programming language source files, and typically includes iterative sequences or "loops." In addition to conventional programming statements, the source code can include user-specified directives for parallelization. Those directives are preferably provided as "comments," i.e., non-executable statements. To distinguish them from conventional comments (which are typically used as explanatory text) the directives preferably take a special format, as discussed further below.

The compilation system 60 includes a preprocessor 60a and a compiler 60b. The preprocessor 60a preforms preliminary analysis of iterative sequences in the source code to determine the dependency directions thereof, and performs certain loop interchanges. The preprocessor 60a also generates directives, of the type referred to above, for use by the compiler 60b. Techniques for dependency direction determination and loop interchanging are known. Modifications on those known techniques for improved parallelization of iterative sequences are described below.

The compiler 60b of the compilation system 60 translates program statements from the preprocessed source code format to object code format. In addition to translating conventional code, the compiler 60b converts iterative sequences in the preprocessed source code to "tiled" sequences for use in parallel execution. This procedure is referred to as "tiling" and is controlled, in part, by the directives generated by the preprocessor 60a, as well as those included in the source code 62 itself.

The object code output by the compilation system 60 is linked with a Runtime Library 66 by link editor 64 to produce code suitable for execution on the digital data processor 10.

Described below is a preferred preprocessor 60a. Although the techniques are applicable to a variety of software languages, such as the Fortran 77 or 90 and C programming languages, the discussion below concerns translation of Fortran 77 source code.

The techniques below can be adapted to operate in connection with previously known preprocessing systems—particularly, as adapted to determine the dependency direction of the source code iterative sequences in the manner described below. Such prior systems include the commercially available KAP/KAI preprocessor of Kuck and Associates, of Illinois, as well as preprocessors available from Pacific Sierra (e.g., the "Vast" preprocessor).

The Preprocessor

1. Overview

The main role of preprocessor 60a is to put annotations into a Fortran program that enable parallel execution; that is, to insert tiling directives. Preprocessor 60a also optionally performs some transformations of the code, such as loop interchanges, either to enable tiling or to optimize.

In the illustrated embodiment, the input to preprocessor 60a is a Fortran program source, and its primary output is also a Fortran program—albeit a "preprocessed" one—which includes the tiling directives. That second program is a valid and correct Fortran program, which when executed serially computes the same results as the original program. That second program is the input to the compiler 60b.

2. The Tiling Directives—Preprocessor Output

The tiling directives which preprocessor 60a puts into the code have the general form of:

```
C*KSR* TILE(<tiling-args>)
C*KSR* END TILE
```

2.1 The tiling-args

The tiling-args which preprocessor 60a can put into the tiling directives have the general form of:

```
<tiling-args>::=<tile-index-list>
               [,<tiling-param>...]
<tiling-param>::=<param-keyword> = <param-value>
```

The tiling-params which are specified in the tiling directive give information about attributes of the tiled-loop. For example, a 'local=t' tiling-arg in the tiling directive means "this tiled-loop contains a variable "t" which should be local to each process".

The tiling-params which preprocessor 60a generates are shown in the following table. These are referred to hereinafter as the primary set of parameters.

Primary Set of Parameters

| Syntax | Example |
| --- | --- |
| order = <dep-list> | order=k |
| lastvalue = <var-list> | smallest |
| local = <var-list> | tmp or (t1, t2) |
| reduction = <var-list> | sum |

The primary set of tiling-params is a subset of the full list of tiling-params which the compiler 60b can accept, as discussed below. However, these tiling parameters contain information which can affect the correctness of the program, and it will be seen below how this affects the tiling.

2.2 Tiling Directive-Summary

The syntax of the preprocessor 60a output tiling directive is:

```
C*KSR* TILE( <index>...    [,order = <dep-list>]
                            [,lastvalue=<variable-list>]
                            [,local=<variable-list>]
                            [,reduction=<variable-list>]
                            [,<extra-params>])
...
C*KSR* END TILE
```

The TILE directive must occur before the loops (i,e., the do statements) whose indices are included in the <tile-index-list>.

The loop-indices in the <tile-index-list> are in the same order they appear in the loopnest; left-to-right corresponds to outer-to-inner in the loopnest. (This is a convention for readability.)

The tiling-params which preprocessor 60a can create is a subset (sometimes called the primary set) of the tiling-params which the compiler 60b can understand. The primary set of tiling-params is: order, lastvalue, local, reduction. Preprocessor 60a does not know the full list of the tiling-params; it relies on the syntax definitions for its parsing.

Tiling parameters which are specified in the TILE input directive will be passed "as is" to the TILE output directive. (That is, if those tiling directives do not belong to the primary set. If they do, it will be flagged as an error and the loop will not be tiled.)

It will be noted that data dependence is carried by loops. And that in the context of preprocessor 60a, dependence is between tiles.

Several tiling obstacles can prevent tiling, for example, a cycle in the dependence. Since a dependence is carried by a loop, it prevents tiling of that loop, while other loop(s) in the same loopnest can still be tiled. Moreover, some statements are not tilable. These can include a goto out of the loopnest and a subroutine call. This tiling obstacle affects the whole loopnest which encloses the non-tilable statement(s).

| | Formal syntax definition: | |
|---|---|---|
| <tiled-loop> | is <tile-begin> <Fortran-do-loop> <tile-end> | |
| <tile-begin> | is C*KSR* TILE ( <tiling-args>) | |
| <tile-end> | is C*KSR* TILE END | |
| <tiling-args> | is <tile-index-list> [, <tiling-param-list>] | |
| <tile-index> | is <loop-index-variable-name> | |
| <tiling-param> | is ORDER | = <order-listing> |
| | or LASTVALUE | = <var-or-invelt-listing> |
| | or REDUCTION | = <var-or-invelt-listing> |
| | or PRIVATE | = <var-listing> |
| | or <extra-keyword> | = <easy-to-parse-string> |
| <order-listing> | is <order> | |
| | or ( <order-list>) | |
| <order> | is [−] <loop-index-variable-name> | |
| <var-or-invelt-listing> | is <var-or-invelt> | |
| | or ( <var-or-invelt-list>) | |
| <var-or-invelt> | is <a variable name or array element name; in the case of an array element name, all the subscript expressions must be invariant with respect to the tiled loop nest> | |
| <var-listing> | is <var> | |
| | or ( <var-list>) | |
| <var> | is <a variable name> | |
| <extra-keyword> | is <a Fortran identifier> | |

3. Automatic Tiling

This section concentrates on the preprocessor 60a output tiling directives from the functional point of view. The discussion (unless otherwise explicitly stated) assumes three things: that preprocessor 60a is doing fully-automatic tiling, that preprocessor 60a optimization directives (AUTOTILE. ROUNDOFF) are set to allow the maximum parallelization, and that there are no Assertions.

The principles for the tiling are to tile from the outermost-index inbound. And to tile as much as possible (i.e, as many indices as possible).

3.1 Overview

A given loopnest cannot always be tiled in all the dimensions. However, there can be more than one possibility for correct tiling. This section discusses which tiling possibility preprocessor 60a will choose. (How the user intervenes in choosing the indices to tile will be discussed in the next section.)

The preprocessor 60a performs dependence analysis on the iterative sequence. The principles of the data dependence analysis may be understood by reference to "Data Dependence and Its Application to Parallel Processing," Michael Wolfe and Utpal Banerjee, International Journal of Parallel Programming, Vol. 16, No. 2, April 1988; "Optimizing Supercompilers for Supercomputers," Michael Wolfe, Ph.D. Thesis, Dept. of Comp. Sci., Report No. 82–1009, Univ. of Illinois, Urbana, Ill., October 1982; and "Advanced Compiler Optimization for Supercomputers," David Padua and Michael Wolfe, Communications of the ACM, Vol. 29, No. 12, December 1986.

Another obstacle is a loop that is imperfectly nested. This occurs where there are statements (other than DO's) between the loops in the loopnest. Imperfect nesting introduces a restriction, as if there is a "wall" where the imperfect nesting occurs. In this case the tiling can take place either "above" or "under" that wall, but not on both sides.

Further is where the bound(s) of a loop depend on the index of an outer loop. This creates a nonrectangular iteration space, and implies a restriction that those two loops are mutually exclusive for tiling. It will be noted that this restriction can be eased for special cases, such as triangular loops.

Based on its analysis of the loopnest (which—among other things—finds out all the tiling obstacles), preprocessor 60a tiles the loop while avoiding the tiling obstacles. In so doing, it produces a loop table which shows the tiling-obstacles and the tiling decisions which are based on them.

The final decision whether or not it is worthwhile to actually execute a tiled-loop in parallel is taken by the compiler (or at runtime). Preprocessor 60a can tile one-dimensional ("1D") loops with dependence, as well as loops with a small amount of work, etc. The main reason is that while preprocessor 60a looks at one loop at a time, more global considerations such as memory distribution may influence the tiling strategy. The compiler can "remove" the TILE directive to eliminate any runtime overhead.

Reordering (loop interchange), if any, takes place after the tiling, and only inside the tile.

3.2 Choosing the indices for tiling

The main role of preprocessor 60a is to insert tiling directives into the code:

---
C*KSR* TILE ( <tile-index-list> [,<tiling-param>. . .] )

---

Choosing the tiling-index-list is the main decision. The other tiling-params are determined accordingly.

For the sake of this discussion, assume that preprocessor 60a creates the loop table in two steps. First, it collects the information about the loopnest, tiling obstacles, etc. Then, it takes the decision about which indices to tile (note that the loops in the loop table are ordered in the same order as the loops in the loopnest, outermost first). So, after preprocessor 60a's analysis, and before any decisions are taken about tiling, the loop table is as shown in FIG. 4A.

There, the "tilable?" field indicates whether there is a tiling obstacle which prevents this particular loop from being tiled, regardless of whether other loops are tiled or not. This occurs when the loop carries a cycle in dependence, or the loop body contains a non-tilable statement, etc.

The "restriction" field notes which other loops in the loopnest might be affected by tiling this loop. This occurs, e.g., when the loop is imperfectly nested, or non-rectangular. As previously mentioned, the point at which imperfectly nesting occurs may be thought of as a "wall." The wall can be "attached" either to the previous loop or to the following loop. It can be arbitrarily assumed that it is attached to the previous loop.

The obstacle field contains descriptive information about the tiling obstacle if any.

Now, all there is left to be done is to fill in the tiling-decision field, based upon the information in the tilable? and restrictions fields. Preprocessor 60a tiles the loop from the outside inbounds, so it can be viewed as if it starts from the first row in the loop table and moves down, tiling as much as possible, while taking care to respect any restrictions.

The loop table can be used to describe the concepts of restriction handling. Whenever it is decided to tile a loop, it is marked as tiled in the tiling-decision field. Then a look is taken at its restriction field: If there is an "IMPERFECT" indication, the preprocessor 60a goes ahead and marks the tiling-decision fields of all the rows below as not-tiled; if there is an <idx> (or more than one), the preprocessor 60a marks the tiling-decision field of the correspondent loop(s) as not-tiled.

Note that the preprocessor 60a always needs to go "downwards" only.

After preprocessor 60a tiles the first loop in a loopnest, rows further down the loop table may already have a tiling decision entry. This results from a restriction imposed by a previously tiled loop. In this case, preprocessor 60a skips that loop row when it comes to it, and moves on the next.

Conceptually, this is the way in which preprocessor 60a chooses the indices which will comprise the <tile-index-list> for the TILE directive. Following that, the other <tiling-param> are determined, and the process of tiling is complete.

The examples in the rest of this section demonstrate this behavior. For each example, the tiled program is provided, with the loop table being shown in the accompanying drawing.

3.3 Examples

Example 1. Inspired by the Linpack benchmark:

---
```
do k = 1,n-1
  do j = k+1, n
    do i = 1, n-k
      a(k+i,j) = a(k+i,j) + t * a(k+i,k)
    enddo
  enddo
enddo
```
---

As shown in FIG. 4B, the k-loop cannot be tiled, since it carries a cycle in dependence. Thus, the restriction entries for k did not apply to the tiling decision for j and i.

Preprocessor 60a tiles this loop as follows:

---
```
do k = 1, n
C*KSR* TILE( J , I)
  DO 2 J=k+1,n-1
    DO 2 I=1,n-k
      A(K+I,J) = A(K+I,J) + T * A(K+I,K)
2   CONTINUE
C*KSR* END TILE
enddo
```
---

Example 2. Matrix multiply

---
```
do i = 1,n
  do j = 1,m
    c(i,j) = 0
    do k = 1, 1
      c(i,j) = c(i,j) + a(i,k) * b(k,j)
    enddo
  enddo
enddo
```
---

As reflected in FIG. 4C, the restriction on the j-loop caused the tiling to "Stop" at that point.

Preprocessor 60a will tile this loop as follows:

---
```
C*KSR* TILE (I,J)
  do i = 1,n
    do j = 1,m
      c(i,j) = 0
      do k = 1, 1
        c(i,j) = c(i,j) + a(i,k) * b(k,j)
      enddo
    enddo
  enddo
C*KSR* END TILE
```
---

Example 3. Inspired by the Legendre Transform:

---
```
      do 400 l = 1, nlev
        do 300 k = 1, nwaves
          ip = nmp(k)
          do 200 j = 1, nlats
            do 100 i = 1, nmp(k)
              sd(l,ip+i)=
                sd(l,ip+i)+fsdl(l,k,j)*pnmd(ip+i)
              sq(l,ip+i)=
                sq(l,ip+i)+fsql(l,k,j)*pnmd(ip+i)
100         continue
200       continue
300     continue
400   continue
```
---

In order to make this example work it is necessary to put in an assertion (not shown here) to remove assumed dependence. Also, in this case preprocessor 60a uses forward substitution technique, so that the k-loop and the j-loop can be made perfectly nested. Preprocessor 60a therefore tiles the program as if the loop was the following.

```
do 400 l = 1, nlev
   do 300 k = 1, nwaves
      do 200 j = 1, nlats
         do 100 i = 1, nnp(k)
            sd(l,nmp(k)+i)=
               sd(l,nmp(k)+i)+fsdl(l,k,j)*pnmd(nmp(k)+i)
            sq(l,nmp(k)+i)=
               sq(l,nmp(k)+i)+fsql(l,k,j)*pnmd(nmp(k)+i)
100      continue
200    continue
300  continue
400 continue
```

As shown in FIG. 4D, when preprocessor 60a decides to tile the k-loop, the restriction on the i-loop enforces a not-tiled decision for i.

```
C*KSR* TILE( L,K,J )
   do 400 l = 1, nlev
      do 300 k = 1, nwaves
         do 200 j = 1, nlats
            do 100 i = 1, nnp(k)
               sd(l,nmp(k)+i)=sd(l,nmp(k)+i)+
                  fsdl(l,k,j)*pnmd(nmp(k)+i)
               sq(l,nmp(k)+i)=sq(l,nmp(k)+i)+
                  fsql(l,k,j)*pnmd(nmp(k)+i)
100         continue
200       continue
300     continue
400   continue
C*KSR* END TILE
```

4. Semi-Automatic Tiling

This section describes the semi-automatic method for tiling, which allow the user to partially override the tiling decisions as done by preprocessor 60a.

4.1 Overview

In the general case there is more then one possibility to choose the indices for tiling. Preprocessor 60a chooses one of those possibilities, through the automatic tiling mechanism. Semi-automatic tiling allows the user to intervene in the process of choosing the indices for tiling, by specifying explicitly which indices he wants to be tiled. Using semi-automatic tiling, the user gains additional control over the tiling, while keeping the same guarantee of correctness as with automatic tiling.

This is done by using the following preprocessor 60a input directive:

```
C*KSR* TILE (<tile-index-list> [, <tiling-param>
   ...])
```

The <tiling-param> can be any parameter which is not one of the primary set of tiling-parameters. The reason for that is that, as mentioned before, the tiling parameters in the primary set (order, lastvalue, local, reduction) can affect the correctness of the program.

Preprocessor 60a transforms the input directive into the following statement:

```
c*KSR* TILE (<tile-index-list>
               [, <tiling-param>...])
   c*KSR* END TILE
```

Where <tiling-param> contains all the tiling parameters which were specified in the C*KSR*TILE directive, and probably additional tiling parameters from the primary set. And where <tile-index-list> is the same as the one which the user specified. If the user specified a combination which is incorrect (according to preprocessor 60a criteria) preprocessor 60a will issue as error.

4.2 Example

Referring again to the "Inspired by the Legendre Transform" example above, by using forward substitution technique, the loop is tiled in 3D. However, the user could tile it in 2D by putting the following line before the loopnest:

```
C*KSR* TILE (l,k)
```

This instructs preprocessor 60a to tile in those indices only. Since it is a legal possibility (as can be seen from the loop table), preprocessor 60a will do so without generating an error message.

```
C*KSR* TILE (l,k)
   do 400 l = 1, nlev
      do 300 k = 1, nwaves
         ip = nimp(k)
         do 200 j = 1, nlats
            do 100 i = 1, nnp(k)
               sd(l,ip+i) = sd(l,ip+i) +
                  fsdl(l,k,j)*pnmd(ip+i)
               sq(l,ip+i) = sq(l,ip+i) +
                  fsql(l,k,j)*pnmd(ip+i)
100         continue
200       continue
300     continue
400   continue
```

Preprocessor 60a tiles it as follows:

```
C*KSR* TILE( L,K )
   do 400 l = 1, nlev
      do 300 k = 1, nwaves
         do 200 i = 1, nlats
            do 100 i = 1, nnp(k)
               sd(ω,nmp(k)+i) = sd(ω,nmp(k)+i) +
                  fsdl(ω,k,j)*pnmd(nmp(k)+i)
               sq(ω,nmp(k)+i) = sq(ω,nmp(k)+i) +
                  fsql(ω,k,j)*pnmd(nmp(k)+i)
100         continue
200       continue
300     continue
400   continue
C*KSR* END TILE
```

5. Related Issues

The above sections focus on the tiling aspect of preprocessor 60a operation. Below, is a brief discussion of other aspects of operation of preprocessor 60a which are not directly related to tiling but which may effect the results of the tiled program.

Distribution is performed when it can help the tiling. For example, to tile part of the loop when there are I/O statements in it.

In some cases code transformation needs to take place in order to tile a program (for example, in the presence of reduction, or when the last-value is needed). Some of those transformation require to know the bounds of a tile—a runtime value, which is available when a tile is being executed.

In most cases the transformation is done by preprocessor 60a. However, if for some reason users (or preprocessor 60a) do this kind of transformations, they might need to know the runtime value of the bounds of the tile. This can be obtained by the use of intrinsic function.

Inner loop indices of a serial loop inside an outer tiled loop are treated by the compiler as locals. For example

```
    C*KSR* TILE( L,K )
       do 400 l = 1, nlev
          do 300 k = 1, nwaves
             do 200 j = 1, nlats
                do 100 i = 1, nnp(k)
                   sd(l,nmp(k)+i)=sd(l,nmp(k)+i)+
                        fsdl(l,k,j)*pnmd(nmp(k)+i)
                   sq(l,nmp(k)+i)=sq(l,nmp(k)+i)+
                        fsql(l,k,j)*pnmd(nmp(k)+i)
100             continue
200          continue
300       continue
400    continue
    C*KSR* END TILE
```

The compiler treats this loop as if there is an implicit local=(i,j).

The Runtime Library

1. Overview

The following sections describe the operation of the Runtime Library 66.

2. The programming model

Runtime Library 66 is language independent. It can be called from a variety of languages, e.g. Fortran 77 or 90, C or the like. However, the following sections discuss it with respect to its use from Fortran programs.

The three parallel constructs which Runtime Library 66 handles are tiling, parallel regions, and parallel sections. The tiling construct allows the user to execute Fortran do-loops in parallel. The parallel sections construct enables the user to execute different code segments of a program in parallel. The parallel regions construct allows the user to have a single code segment of a program run multiple times simultaneously.

All parallel constructs may be nested. However, the Runtime Library 66 may run any parallel construct serially if sufficient resources are not available.

The rest of this section contains a short description of the parallel constructs which are supported by Runtime Library 66. The following sections will discuss each one in detail.

2.1 Tiling

Tiling of a Fortran loopnest is a partitioning of the iteration space into rectangular parallelipiped chunks called tiles. Hence, a tile is a collection of iterations. The group of tiles which construct a loopnest is called tile-family. The tiles are the basic entities which can be executed in parallel. Numerous processors can execute the same loopnest, each one of them working on a separate tile simultaneously.

Example:

```
    C*KSR* TILE ( i, j)
       do 10 i = 1,n
          do 10 j = 1,m
             a(i, j) = 0.0
10     continue
    C*KSR* END TILE
```

In this case, the loopnest is tiled in the two indices i and j. It is possible to tile only part of the loop indices, e.g.—in the above example the following tiling is also possible:

```
    C*KSR* TILE ( i )
       do 10 i = 1,n
          do 10 i = 1,m
             a(i,j) = 0.0
10     continue
    C*KSR* END TILE
```

The tiling model has two qualities which are important to Runtime Library 66. First, flexibility in terms of work/overhead ratio. The Runtime Library 66 it provides a general way to handle granularity of parallelism ranging from one iteration to any number of iterations. Second, convenience in handling dependency: The Runtime Library 66 provides a simple way to define a partial order (tiles dependency), and a way to exploit parallelism in the presence of dependency.

2.2 Affinity Regions

The affinity region mechanism applies to the tiling parallel construct. It provides a method for the user to convey optimization information to Runtime Library 66. An affinity region is a collection of tile families which Runtime Library 66 attempts to execute in a fashion so as to avoid data contention and movement. Runtime Library 66 keeps some information about the entire set of tile families, and uses that to distribute tiles to processors so that processors will execute on the same data from tile family to tile family.

To declare an affinity region, the user must enclose the desired code within the AFFINITY REGION and END AFFINITY REGION directives. The directives must not interrupt a tile family. If declared within a parallel section, the affinity region must be within one section block. The declaration must be within a single subroutine or main program.

These are parameters which affect efficiency of execution rather than correctness. Affinity region requires global decision making, and this is the way for the user to specify them. If the user specified the same parameters in a TILE directive embedded within an AFFINITY REGION, the parameters in the AFFINITY REGION override the ones in the TILE directive.

Affinity regions can be nested.

Example:

```
    C*KSR* AFFINITY REGION ( i,j, STRATEGY = MOD,
                                NUMTHREADS = 8)
       do k
    C*KSR* TILE ( i,j)
          do i
             do j
                ....
             enddo
          enddo
    C*KSR* END TILE ( i,j,)
       enddo
    C*KSR* END AFFINITY REGION
```

2.3 Team Operators

Parallel constructs are executed in Runtime Library 66 by groups of pthreads. In the default mode, these pthread groups are invisible to the user. However, Runtime Library 66 does implement an interface to these pthread groups for the user who wants a greater degree of control of his program. The functions that manage pthread groups are called "team" operators. The interface is described in detail at the end of this section.

2.3.1 Definition of a team

Each pthread group, or team, consists of one or more pthreads, where one pthread is designated a "leader". Each team member has a member id unique within the team, starting at 0 and ascending, with no gaps in the sequence. The team leader's member id will be 0.

2.3.2 Default Team Usage

Runtime Library 66 will create, manage, and disband teams automatically without direction from the user. However, the Runtime Library 66 interface does allow the user to explicitly specify team creation, dispersion, and usage.

If the user does not specify team usage, Runtime Library 66 follows the general practice of creating a new thread team for every new parallel construct. The thread team is disbanded at the end of the construct. An exception is made for TILE constructs that are lexically enclosed within an AFFINITY REGION directive; all such TILE constructs are executed by the same thread team.

2.3.3 Team Ids

Team IDs are unique throughout the program.

2.3.4 Team Creation

The pthread that runs across an ipr_create_team call executes the call and becomes the team leader. Pthreads may be members of several teams.

2.3.5 Restrictions in Use of Teams

A team may not be used in parallel—it can only execute one construct at a time. However, if constructs are nested, a pthread may be a member of several teams, and may execute multiple constructs.

A parallel construct may only be executed by a team where the pthread that encounters the construct is a member and is the leader of the team. The motivation for this restriction is a fundamental implementation issue. The pthread that encounters the construct is the only pthread that has the context to execute the serial code before and after the parallel construct. It could be possible for Runtime Library 66 to allow a pthread to call a team that it is not a member of to execute the construct, but the original pthread will be forced to idle during the parallel execution.

3. Interfaces 3.1 Runtime Library 66/User Interface

Users pass input to Runtime Library 66 through run time parameters, program directives or subroutine calls. The run time parameters enable the user to control the resources and calculations done by Runtime Library 66, allowing her to tune for performance. The program directives allow the user to indicate opportunities for parallelism. Program directives may be addressed to the ksr compiler or preprocessor 60a or both. Subroutine calls are used to explicitly control Runtime Library 66 thread group (team) management.

3.1.1 Program directives

As noted above, program directives are in the form of Fortran comments. When a program directive is present, the compiler 60b generates calls to the Runtime Library 66 runtime library to cause the parallel execution of the loopnest.

The parallel section, parallel region, and set directives are generated only by the user and understood only by the compiler. Affinity region directives are generated by the user or the compiler, and understood only by the compiler. Tiling directives are generated by the user and/or the compiler 60b.

To tile a Fortran program, the user can either put in the tiling directives by hand, or rely on the preprocessor 60a to do so. The preprocessor 60a takes a Fortran program as an input, and create the transformed Fortran program which has the tiling directives in it. It is possible to use a mixture of manual and automatic tiling; hence, the preprocessor 60a can take a partially tiled program, retain the loopnests which are already tiled alone, and tile the other loops. The output of the preprocessor 60a is a legal Fortran program;

With the fully automatic mode, the user invokes the compilation system 60, which in turn invokes the preprocessor 60a. It will be appreciated that the Runtime Library 66 itself is not aware of the difference between automatic and semi automatic tiling. These different methods produce identical input from Runtime Library 66's point of view.

3.1.2 Run Time Parameters

The runtime environment parameters, which are set forth in FIG. 6 are defined using Unix environment variables. These parameters can also be set using the SET directive.

In order to achieve parallel execution, the code within a parallel construct is transformed into a special kind of subroutine. The task-subroutine(s) resembles a nested subroutine in the manner of Pascal. It will be appreciated that this is not an extension to programming language itself, the task-subroutines are created in the internal data structures of the the compilation system 60 only.

FIG. 7 illustrates the transformation of a tile into a task-subroutine. In the drawing the original program (11.f) is denoted as block 70a. The tiled program (11.cmp) is denoted as block 70b. That tile program is internally transformed into ("as if") the code shown in block 70c.

By doing this transformation, the tiled loopnest turned into a subroutine. The arguments to this subroutine are the bounds of the tile. In the example shown in FIG. 7,

```
do 10 i=1,n
do 10 j=1,n
``` was transformed to

```
do 10 i=i1,i2
do 10 j=j1,j2
``` and the bound become the arguments to the task-subroutine. For example, if a tile with a 16×16 tile-size is used, one thread will issue a call to task foo_$1 (32, 47, 16, 31). This will cause the execution of

```
do 10 i=32, 47
do 10 j=16, 31
    a(i,j) = 0.0
10 continue
```

Hence, this thread executes 16 iterations in the i dimension, and 16 iterations in the j dimension. Runtime Library 66 will invoke the calls to task foo_$1 from the different threads with the appropriate arguments such that all the iterations will be executed. The parallelism is exercised by having many threads calling the task-subroutine different arguments (i.e., bounds).

The existence of the parallel constructs triggers a call to "execute" routine in the Runtime Library 66, and the compiler passes the name of the task-subroutine as an argument. The arguments of these executes routines contain all the information about the construct which is needed in order to execute it in parallel. Some of this information comes from the program directive itself (i.e., which indices to tile, dependency information etc.); some information comes from the source program (i.e. bounds and stride of the loopnest); some of the information is generated by the compilation system 60 (i.e., ssb, codesize—as discussed below). There is also some data which is needed to interface between the code inside the task-subroutine and outside it (pointer to the task-subroutine, frame pointer, flag to support last value).

This embodiment provides a simple way for the tile to be executed as an independent entity (by being a subroutine)

and at the same time recognize the variables of its parent routine using an existing compiler mechanism (by being a nested subroutine). In this particular example, it recognizes the array a.

3.2 Runtime Library/Operating System interface

Runtime Library 66 parallelism is implemented with the OSF implementation of pthreads. The interface between the OS and Runtime Library 66 and pthreads and Runtime System 66 is not discussed in detail here, but there are some basic assumptions about the world in which Runtime Library 66 lives which are needed in order to establish the framework.

Runtime Library 66 uses variable number of threads during the life of the program. A single thread is initiated at startup, and becomes the program leader thread. This thread is responsible for executing all serial portions of the program.

Each parallel construct is executed by a team of threads called a "thread group". Each thread group has one thread that is designated a group leader, while all other members are group slaves.

Runtime Library 66 delegates much of the load balancing between threads to the operating system scheduler. In some cases Runtime Library 66 assumes that a thread is associated with a processor, and that this binding remains. This is an important assumption used by Runtime Library 66 in the modulo tiling strategy where work is partitioned so that a cell will reference data it already owns.

Runtime Library 66 may pass information to the OS scheduler to help it make more informed decisions about load balancing.

4. Tiling

Tiling, as stated above, is a method to execute a loopnest in parallel. This section will explain the semantics of the Tiling directive and illustrate the way a tiled loop is executed.

4.1 Tiling Directive—Semantics

Not every loop can be tiled in a simple way. Some loops can't be tiled at all, and some loops can be tiled only with special care to ensure correct execution. "Correct execution" in this context means the same result as by running the same program serially.

The syntax of the tiling directive enables specifications of tiling parameters which will provide the additional point of connection of the bracket correct execution. These are order, lastvalue, local and reduction.

In addition, there are other tiling parameters which do not affect the correctness of the program, but do affect the performance.

4.2 Tiling with Order Tiling Parameter

The order tiling parameter specifies a partial order for execution of tiles, which is derived from the data dependency within the tiled loopnest. The order tiling parameter deserves some special attention in this section because it can be confusing, and often not intuitive, to determine the dependency and thus the correct order. In addition, it is one of the tiling-parameters which can influence the correctness of the program execution.

The fact that dependency—and thus the execution order tiling directive—is not easy to determine is not worrisome, since it is typically detected automatically by the preprocessor 60a. If the user chooses not to use the preprocessor 60a he or she can specify it, and than it becomes his or her responsibility.

When a loopnest is tiled with order tiling parameter, Runtime Library 66 will try to achieve parallel execution of that loop while ensuring the correct order of execution. In some cases obeying the order will cause serial execution. However, in some cases a loop which is tiled with order can run in parallel.

When a loopnest is executed in parallel, the iterations will not necessarily be executed in the same order as by serial execution of the same loopnest. In some cases it doesn't matter, while in other cases a data-dependency implies a partial order between the iterations. This, in turn, implies a partial order between tiles to guarantee correct execution.

The way to handle it is to specify a order tiling directive. This will cause Runtime Library 66 to do the necessary synchronization between the execution of tiles to ensure the correct execution.

Example:

```
do 10 i = 2,n-1
do 10 j = 2,m-1
   a(i,j) = a( i-1 , j+1 ) + a ( i+1 , j-1)
10 continue
```

This loopnest can be tiled in both dimensions in the following way:

```
C*KSR* TILE ( i, j, ORDER = -J, I )
   do 10 i = 2,n-1
   do 10 j = 2,m-1
      a(i,j) = a(i-1,j+1) + a(i+1,j-1)
   10 continue
C*KSR* END TILE
```

This defines the following partial order between the tiles: execution of a tile can start when the tile before in the I-th direction completed, and the tile after in the J-th direction completed. In the diagram presented FIG. 8 the tile marked by "x" can be executed when the tiles marked by "d" completed. This will typically cause Runtime Library 66 to choose the wave-front tiling strategy, which enables parallel execution in the presence of order in two dimensions.

4.3 The order tiling parameter and Data Dependency—by example

As noted above, the ORDER=-J, I is typically inserted by the preprocessor 60a. This section explains by way of example the relations between data dependency and tiling with order.

Referring to the original program:

```
do 10 i = 1,n
do 10 i = 1,m
   a(i,j) = a(i-1, j+1) + a (i+1, j-1)
10 continue
```

First, to define the order in which iterations must be executed, one must look at the loop body. Assuming the position of a given iteration is marked by 'x', and the position of the iteration(s) upon which it depends is marked by "*", the resulting diagram is:

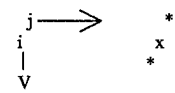

In the original loop j is the inner index, hence the one which moves faster; so when 'x' is executed, it must be the case that the iterations on its upper-right is already done (this is indicated by a '+'), and the iteration on its lower-left is not-done (this is indicated by a '−'). The result is as follows:

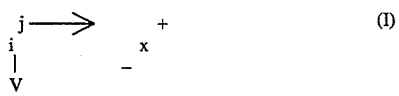

In other words, it is safe to execute an iteration in position x, if and only if the iteration on its upper-right is done. This can be reduced to dependency between two iterations, as follows:

The next step is to figure out the partial-order between tiles. Inside the tile the original order is preserved. In order to examine what happens between the tiles, the "stencil" in (I), above, can be moved around the borders of an imaginary tile, as follows:

```
       | + + + | +
  — — // — — — // — —
       | x x x x | +
     — | x     x | +
     — | x x x x |
  — — // — — — // — —
     — | — — —   |
```

The equivalent of (II) will be as follows, with capital letters used to denote tiles:

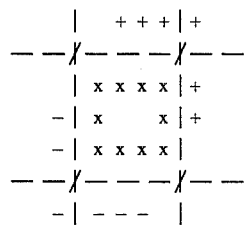

The D in the upper-right is redundant: the bottom line implies that a tile x must wait for the tile to its right before it can start. So, if the tile in the lower-left waits for the tile in its upper-left, it is enough to ensure that the tile on the upper right will be done already. Hence, the lower-left tile (which is marked by x) must wait for the tiles "above" and "to its right" to be done, and by recursion the correct order is defined. Hence, the result is as follows:

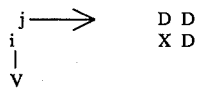

Which is expressed in the tiling directive in the following way:

---
C*KSR* TILE ( I,J,ORDER=( –J , I ))
---

4.4 Tiling with local, lastvalue, reduction

In addition to the indices and dependency parameters, there are three other tiling parameters which can affect the correctness of the program. Typically, those tiling parameters will be created by the preprocessor 60a. They are:

LOCAL—declaration of local variables needed by the new lexical subroutine. This is handled by the compiler 60b, and is not passed on to Runtime Library 66.

LASTVALUE—indicates whether the last value of the loop indices must be preserved after the loop execution. Runtime Library 66 must handle this, because the parallelization of the loop affects the execution order of the iterations. Runtime Library 66 calculates the last value by checking the bounds of each tile executed. When the tile containing the highest bounds of the iteration space is executed, the last value is passed by Runtime Library 66 to the compilation system 60.

REDUCTION—declares that a reduction must be handled on a variable within the tile. Reduction is handled by the compilation system 60, and needs some support from Runtime Library 66.

4.5 Other tiling parameters

There are tiling parameters which enables the user to intervene with Runtime Library 66's decisions, and influence efficiency decisions. They are supplied only by the user and never by the compilation system 60 and are referred to as "extra" parameters in the preceding sections. Those parameters are listed below.

TILESIZE—this is a user supplied vector for the tile size of the following tile family. This vector is only valid for that tile family, and does not apply to any subsequent loopnests. Possible values are n (where n is a numerical value greater than 0), x (where x is a variable), or "*" (a symbol indicating that the tile should take the entire iteration space in that dimension. The vector must supply values for all tiled indices. Syntax follows the general compilation system 60 tiling parameter syntax.

STRATEGY—a user directive on what tiling strategy to use on the following tile family. This value is only valid for that tile family. Possible values are GRAB or MOD. Syntax follows the general the compilation system 60 tiling parameter syntax.

4.6 Execution Of a Tiled Loopnest

When a new tile-family is about to start execution, Runtime Library 66 decides on a work-plan. This decision is based upon the factors including affinity, dependency, data-locality.

The work-plan is a collection of decisions which will determine the parallel execution of the tile-family: allocating threads, partitioning of the iteration space, and choosing a tiling strategy. Choosing the right work-plan, and—in particular—choosing the right strategy, has a major effect on performance. In principle, the work-plan is chosen when a new tile-family starts. If this tile-family belongs to an affinity region, the work-plan is based upon a "template" of the work-plan of the affinity region; this will be discussed later.

4.7 Allocation of Threads

On tiling, Runtime Library 66 considers the amount of resources available, and for each tile family, uses n threads, where n is less or equal to the number of processors available to this program. The default will be to use the maximum number of processors available; if the tile family is structured so that it is not worth using the maximum number, a smaller number of threads will be chosen. This algorithm is used regardless of nesting.

There are some difference in the allocation of threads according to the tiling strategy which is used (tiling strategy is described below):

When using the GRAB strategy, Runtime Library 66 lets the scheduler handle all thread-processor bindings, load balancing, affinity, etc.

When using the MODULO and WAVEFRONT strategy, Runtime Library 66 would like to assume that the thread→processor binding is constant. Runtime Library 66 constructs and assigns tiles accordingly. This binding assumption would make it useful to let the scheduler know that Runtime Library 66 would like higher thread→processor stability on these kinds of threads.

These rules are also followed for nested parallel structures.

4.8 Tile size and shape

A tile is defined in number of iteration space, hence, the tile-size is defined in terms of the iteration space. The tile-size vector specifies the number of iterations in each dimension of the tile-family. For example, a loop

```
do i = 1, 100
    do j = 1, 200
``` which is divided into tiles may have a tile-size vector of (16,32), hence—the tile-size is 16×32=512 iteration. Note that the tile-size need not fit directly into the iteration space. Runtime Library 66 will "trim" the edges of tiles which overflow outside the iteration space.

The tile-size is determined once at the beginning of the execution of a tile-family, and remains constant during the execution of that tile-family. However, the same tile-family can be executed more than once in the program, and the tile-size can be different each time—due to, for example, different bounds of the loops.

Tile shapes must be chosen with two objectives in mind: maximizing parallelism and making good use of the allcache memory system. The following discussion weaves together considerations of dependency and subpage access to achieve the two goals.

A tile is a rectangular n-dimensional parallelipiped with a dimension corresponding to each of the dimensions of the iteration space. The tile shape question is this—how long should the tile be in each dimension? The basic idea is to "stretch" the tiles in the direction of array references and to "stretch" the tiles in the direction of dependency.

The first point will avoid contention between two or more s threads for the same subpage. The second point will minimize synchronization. Tiles will be multiplies of subpages, or two subpages.

The final decision about tile-size is a compromise between contradicting considerations: on the one hand, we want to have big enough tiles, to justify the unavoidable overhead of starting each tile. On the other hand, we want to have many tiles in order to optimize the load balance. After the shape has been decided, we determine the actual size by looking at the amount of work to be done, the number of available processors, etc. If the tiles are too small, we "stretch" them.

4.9 Tiling Strategy

The tiling strategy is the method used to divide the work among the pthreads so that all the tiles which comprise the tile-family will be executed correctly and efficiently.

Like tile-size, the tiling strategy is determined at the beginning of execution of a new tile-family. Runtime Library 66 uses a self-scheduling mechanism, which means that after an initial setup done by the leader, each thread can find its chunk of work by itself. Hence, the strategy is expressed in terms of what a thread must do to find out what it needs to do next.

There are two fundamental principles regarding the Runtime Library 66 strategies motivated by a desire for design elegance and low runtime overhead. The first is exactness—the strategy defines exactly how the next tile is selected in each situation. The idea is to leave as little calculation as possible to the point when a thread needs to get the next tile, and therefore minimize overhead in the runtime processing to get the next tile. Once a strategy is chosen, choosing a new tile should be a very fast operation.

The second principle is progression—the strategies are structured so execution starts from a known point in the iteration space and proceeds in a known direction. The motivation is to avoid the need for complicated data-structures that record and remember which part of the iteration space is has been covered.

Runtime Library 66 considers the following factors when deciding upon a tiling strategy:

1) Existence of data dependencies. Data dependencies create ordering requirements between the tiles, which necessitates synchronization between tiles. In the extreme case, data dependency may cause a tile family to execute serially, because all the tiles of the tile family are in the same ordering relationship. In other cases, some degree of parallelization is available in the tile family because each tile is independent of some number of other tiles.

2) Specification of strategy by the user. The user can specify a strategy by setting the PLSTRATEGY environment variable, using the SET directive, or passing a strategy value as a parameter to the TILE or AFFINITY REGION directives 3) Specification of tile size by user. If the user specifies that a dimension with ordering requirements should be tiled, the tiling strategy may be required to handle ordering.

Runtime Library 66's tiling strategy decision table is as follows:

(x) = don't care

| User Spec'ed Strategy | Number of Indices w/Order | User Spec'ed tile size | User Spec'ed tile size cuts n ordered indices | Chosen strategy |
|---|---|---|---|---|
| FALSE | 0 | x | x | MODULO/SLICE |
| FALSE | 1 | FALSE | x | MODULO/SLICE |
| FALSE | 1 | TRUE | 0 | MODULO/SLICE |
| FALSE | 1 | TRUE | 1 | WAVEFRONT |
| FALSE | >=2 | FALSE | x | WAVEFRONT |
| FALSE | >=2 | TRUE | 0 | MODULO/SLICE:q |
| FALSE | >=2 | TRUE | 1–2 | WAVEFRONT |
| FALSE | >=2 | TRUE | >2 | Error reported |
| TRUE | 0 | x | x | User specified strategy |
| TRUE | 1 | FALSE | x | User specified strategy |
| TRUE | 1 | TRUE | 0 | User specified strategy |
| TRUE | 1 | TRUE | 1 | Error if user strategy!= WAVEFRONT |
| TRUE | >=2 | FALSE | x | Error if user strategy!= WAVEFRONT |
| TRUE | >=2 | TRUE | 0 | User specified strategy |
| TRUE | >=2 | TRUE | 1–2 | Error if user strategy!= WAVEFRONT |
| TRUE | >=2 | TRUE | >2 | Error reported |

Note that the fact that a tile family is tiled and that tiles are distributed to multiple threads does not mandate parallelism. A tile family that has ordering requirements may be tiled but still execute serially, due to the synchronization required by the ordering information. This situation may be optimal if the lack of parallelization is overcome by the advantage of maintaining data affinity.

The following is a description of Runtime Library 66 strategies.

SLICE strategy

This strategy simply divides the tile family iteration space into n tiles where n is equal to the number of pthreads participating in the construct and assigns a tile to each thread. This is the default strategy for tile families not enclosed within an affinity region and is designed to minimize tiling overhead and the possibility of data contention at tile boundaries.

MODULO strategy

This strategy distributes tiles evenly throughout the iteration space to the thread group. Assume that threads and tiles are numbered starting from 0. The tiles which will be executed by a given thread are those such that ---
tile-number MODULO number-of-allocated-
threads = thread-id

---

When expressed in terms of a self-scheduling strategy, it means that a thread whose thread-id is P will execute the following tiles:

first tile is tile whose number is same as the thread-id next tile is previous tile+(number of participating threads)

This strategy is a semi-static one. It is dynamic in terms of the number of processors which are available when the execution of the tile-family started, but cannot adjust to a change of the availability of processors during the execution of the tile-family and to an unbalanced load.

The major advantages of this strategy are that no synchronization between tiles is required. Also, the set iteration space→thread mapping is designed to handle data affinity, especially when used with affinity regions. Further, the "modulo" distribution system of the iteration→thread mapping, is designed to optimize load balancing within affinity regions, where each tile family within the affinity region may cover a different part of the iteration space. Because of this distribution scheme, the percentage of work allocated to each thread is not dependent on the iteration space used by a single tile family.

This is the default strategy for tile families enclosed within affinity regions.

WAVEFRONT strategy

This strategy is designed to execute tile families with data dependencies correctly and with maximum parallelization.

With this strategy, tiles are executed in a "wavefront" pattern on a two dimensional plane. Runtime Library 66 chooses two indices out of the list of tiled indices that have ordering requirements to form the 2D wavefront plane of the iteration space. One index is designated the "column" index while the other is designated the "subtile" index. The columns of the 2D plane are allocated in a modulo fashion to the members of the executing threads team. Each column is made up of a number of tiles.

Each tile has a adjacent, dominant neighboring tile that it is dependent upon, and cannot begin execution until that neighbor is finished. A tile's dominant neighbor will be in the column to the right or left, depending on the ordering requirements of the column index. The dominant tile will be on the same subtile index value. Execution of the tile family begins from one of the four corners of the 2D plane, depending on the ordering of the column and subtile index.

This strategy also attempts to distribute tiles evenly throughout the iteration space to the executing thread team, and is compatible with the use of the affinity region directive.

Runtime Library 66 handles an iteration space with ordering requirements that has more or less than 2 index dimensions in a number of ways. If the iteration space has only one index, and it has an ordering requirement, the work must be done serially, and Runtime Library 66 attempts to create one tile. If the user forces tiling by specifying tile size, Runtime Library 66 executes the tile family in the 2D wavefront pattern, where the subtile index is 1.

If the iteration space has more than two dimensions, but only two indices have ordering requirements, Runtime Library 66 processes the tile family as a series of 2D planes, where the wavefront strategy can be conducted on each plane independently. If there are more than two dimensions, and more than two indices that have ordering requirements, Runtime Library 66 will not tile the additional ordered indices, and will create "chunkier" tiles to execute in the 2D wavefront strategy.

User specified tile sizes that require tiling in more than two ordered indices are refused.

GRAB strategy

This strategy issues tiles on a first-come, first-serve basis to the thread group. Each thread must obtain a common lock to access a tile for execution. This strategy is designed to load balance between the threads of the thread group.

Note that this strategy does not consider data affinity considerations when assigning tiles to processors, and that it would not be a good strategy to choose in conjunction with affinity regions.

4.10 Relative Advantages of the Strategies

The semi-static MODULO tiling-strategy has two main advantages: it is easy to maintain data-affinity; and it minimizes synchronization overhead. On the other hand, tile to thread assignments are static and will not adjust to unbalanced load during execution time.

The SLICE tiling strategy is also semi static and has the most minimal tiling overhead, but makes no attempt to maintain data affinity across tile families.

The GRAB tiling strategy, is dynamic and will keep each thread busy as much as possible, but will probably cause data migration to occur more frequently. In addition to affinity loss problems is the additional synchronization overhead from the locking required to access a new tile.

The WAVEFRONT tiling strategy is required when tile families have ordering requirements caused by data dependencies. Data affinity is maintained, as with the modulo strategy, but the tile-tile synchronization required creates additional overhead.

4.11 Work-plan—Examples

The following are few examples of the work-plan chosen by Runtime Library 66 to execute tiled-loops. Details of why a particular work-plan was chosen are note given; rather, this attempts to give the flavor of the behavior of various work-plans.

EXAMPLE 1

A 2D iteration space is tiled in 2D. The number of available processors is smaller than the number of columns. There is no dependency.

The work-plan is depicted in FIG. 9A. There,

---
| number of processors: | N |
| tile-size: | a whole column |
| strategy: | modulo |

---

EXAMPLE 2

The same as above, only this time there is a dependency in both directions: the strategy used is the modulo strategy with dependency (wave front). Note that this strategy is data-affinity efficient when used in the same affinity group with the normal modulo strategy which is shown in the previous example.

The work-plan is depicted in FIG. 9B. There,

| number of processors: | N |
|---|---|
| tile-size: | chunks of column |
| strategy: | wavefront |

EXAMPLE 3

Data affinity is not an issue, load balance is important. There is no dependency. The ssb point in both i and j index.

Figure 9C:
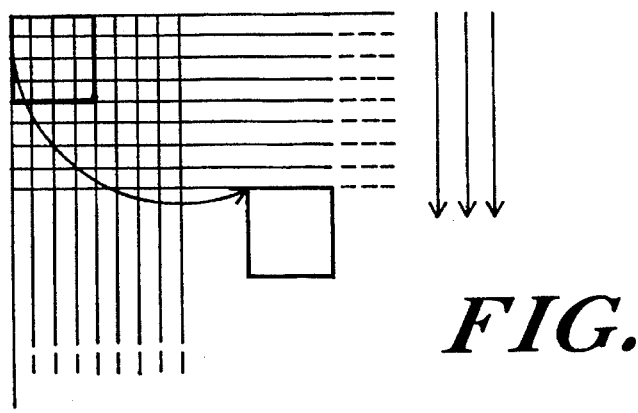

The work-plan is depicted in FIG. 9C. There,

| number of processor: | N |
|---|---|
| tile-size: | columns |
| strategy: | GRAB |

Note that in this example the arrows shows how the tiles are numbered. This is not to be confused with order of tiles: the numbering is just a way to keep track of what has been executed. The way to number the tiles is arbitrary, and does nor reflect any particular order in which the tiles need to be executed.

5. Affinity Region

Runtime Library 66 tries to allocate work to threads in a way which will minimize contention and data movement.

The creation of affinity region is a way to coordinate the tiling work-plan decisions made for a group of tile families. The following assumptions are made to support this goal:

1. Data movement is expensive.
2. The tile families within the affinity region reference the same data.
3. The tile families within the affinity region tend to have the same data space @iteration space mapping.
4. The data space is aligned on subpage boundaries, and tiles can be constructed that will avoid data contention.

In earlier sections, the work-plan decision was described as a two-part decision, with a tile→thread mapping component and a tile size component. When affinity region are declared, these decisions are made across the whole set of tile families in the affinity region.

The tile→thread mapping is maintained across tile families so that the same thread (and hopefully, same processor) works on each tile, maintaining data locality. The affinity region directive is only effective with some tiling strategies. For example, the grab tiling strategy does not allow the maintenance of a tile→thread mapping.

The tile size decision is also made by considering the iteration space of all the tile families in the affinity region, rather than the iteration space of a single tile family. As a result, all tile families share the same tile size, making it possible to maintain a tile@thread mapping across tile families.

The tile work-plan decision may reflect factors that affect only some of the tile families, but that are extended to all of the tile families. For example, a data dependency may exist on a particular index in some of the tile families. The effect the dependency has on a tiling strategy applies to all tile families in the affinity region.

Note that the creation of affinity region is purely an efficiency issue.

5.1 Recognizing an Affinity Region

Affinity regions may be declared by the user, or identified by the compilation system 60.

5.2 Common Index Set

It must be possible for all the loopnests in an affinity region to be tiled on the same set of indices. This is the "common index set" rule. This is necessary because the affinity oriented strategies need an iteration→processor mapping function which determines which processor executes the tile. If the number of tiled indices varies loopnest to loopnest, this mapping will fail. This does not mean that every tile family have identical tiled indices, just that there is an intersection of indices among the different loop nests.

6. Performance issues

6.1 Overhead

There is overhead in the following aspects of operation: (1) affinity region (create the template); (2) start of tile family (create the MCB); (3) choose the next tile (by each thread).

6.2 Runtime Library 66 Decision Making

Runtime Library 66 is designed with efficiency as the major consideration. One important concept is the propagation of decisions to the earliest possible time. Obviously, it is more efficient to take a decision at compile time rather than at runtime. Consequently, it is more efficient to take a decision when a tile-family starts execution, rather than at the beginning of execution of each tile.

Runtime Library 66's method is to take a decision as soon as possible, based upon all the information available. Once the decision has been taken, Runtime Library 66 forgets the reasons. The goal is that by the time a particular thread needs to find the next tile to execute, it will be a very simple operation, typically involving a couple of simple comparisons and additions.

At runtime, when Runtime Library 66 starts to execute a tile-family, all the information about this loopnest is already known: whether or not there is a dependency between the tiles, how many processors are available, the size of the loop (bounds) etc. Based upon that, Runtime Library 66 can decide upon a tiling strategy.

There are many factors which influence the choice of tiling strategies. Some of them are known at compile time, e.g., dependency, or the amount of work in the loop. Others can be known at compile time—e.g., the number of available processors. Some of the information is available at runtime in the general case, but in practice it is very often either known at compile time (or known to the user who can provide it via directives).

The system has some decision-points, where decisions can be taken. These are at compile time, by compilation system 60. At runtime, by the Runtime Library 66, upon starting a new tile-family (_pr_execute_tiles), and when looking for next tile to do (_pr_tile_next).

The following is a list of factors which may influence Runtime Library 66's decisions. The order of these factors, as presented, is essentially random.

size of loop (bounds)

static amount of work in one iteration dynamic amount of work in one iteration dependency between tiles mapping of iterations to data number of procs data affinity (ssb)

history (affinity region)

resource (processors) availability (load balance)

[important array]

7. Runtime Library 66 Architecture

7.1 Block diagram

Figure 10:
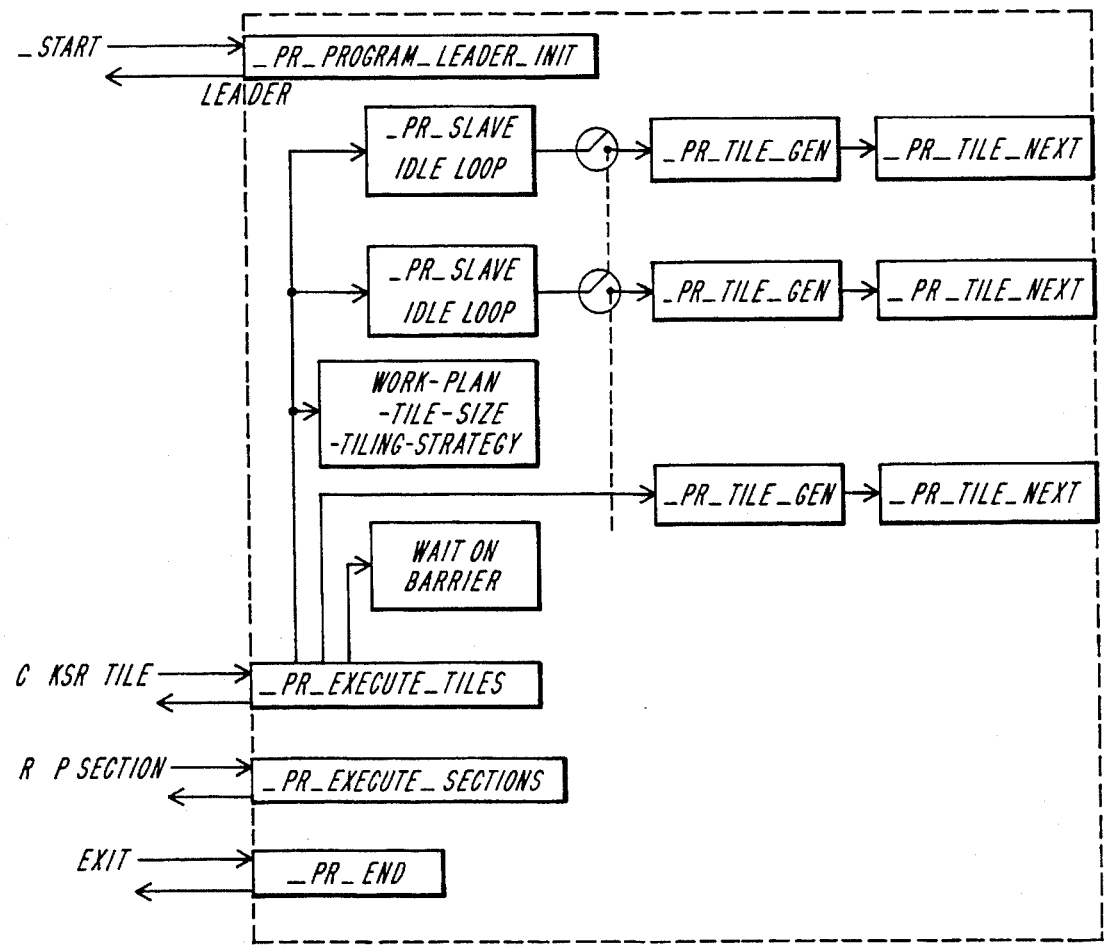
FIG. 10 is a high level block-diagram of Runtime Library 66 of FIG. 3.

FIG. 10 is a high level block-diagram of Runtime Library 66. It describes the main routines and the flow of control. The function of these routines is described below.

_pr_program_master init is called once at the very beginning of execution a program. It reads Runtime Library 66's environment variable to get user's configuration (such as the desired number of processors, for example). Does general initialization of Runtime Library 66.

_pr_slave is the "main" of the slaves. There are many of them running at the same time—this is basically an idle loop. When the Leader "closes the switch" it will call the tile-generator (pr tile_gen) and when it finishes its work it returns to pr slave and will stay in the idle loop until the next time the Leader lets it go.

_pr_execute_tiles_start to execute a tile family: allocate threads (either create them or use existing ones). Also, initialize the execution data for a particular tiled loop. This involves deciding upon tiling-strategy, and other initialization stuff. Its output is put in a central datastructure called the MCB (Master Control Block) which is visible to all the threads. After this is done, the Leader is not needed any more as such; the leader puts the slaves to work, and joins in, i.e., calls _pr_tile_gen.

Upon returning from _pr_tile_gen, it resumes its responsibilities as the Leader: it waits until all the slaves finish their work, do the necessary cleanup and returns to its caller.

The MCB holds the information regarding the tiles. The first section holds information about the tile-family. The second section holds information about each dimension of the tile family (order)—hence, it contains arrays(d) of fields, where d=1 . . . order. A typical value of "order" is small (4 is enough, 8 is more than enough).

In the following table, each field is prefixed with a letter which indicates its characteristics regarding to when it gets its value: "C" stands for Compile time; "I" stands for Initialization of the MCB, i.e., once for each execution of a tile family.

| | MCB - Master Control Block | |
|---|---|---|
| | Field | Description |
| | | Family Section: |
| I | tile_efp | the FP (Frame Pointer) of the parent routine |
| C | tile_start | points to the text of the tile (in fact, CP of the tile) |
| C | order | as specified by tile-family-parameters |
| C | affinity | as specified by tile-family-parameters |
| C | dependency | as specified by tile-family-parameters |
| C | code_size | as computed by the compiler (back-end) |
| I | tile_strategy | code describing strategy to cover the tile family. |
| | | Order Section: |
| I | ltile_size (d) | l number of iterations in this dimension |
| C/I | loop-low-bound(d) | as specified by tile-family-parameters |
| C/I | loop-high-bound(d) | as specified by tile-family-parameters |
| C/I | loop-stride(d) | as specified by tile-family-parameters |

_pr_tile_gen the routine which does the actual call to the task-subroutines with the appropriate arguments;

_pr_tile_next is the routine which select the next tile to be executed by this thread. It returns a list of integers which are the list of low bounds of a tile, i.e., the corner of the tile. Since the tile-size is fixed, this defines the tile. _pr_tile_next consults the MCB, and this is where the tiling-strategy is actually takes an affect: the basic control structure of _pr_tile_next is a switch statement ((as referred to in the C programming language, or a case statement as referred to in Pascal) according to the workplan.

_pr_execute_parallel sections allocates slaves to execute the sections, and gives each of them a second block.

_pr_end is executed once when the program finished. In addition to general cleanup, it produces statistics and reports.

Runtime Library—Internal Architecture

1. Overview

The following sections describe in greater detail the Runtime Library 66 and, more particularly, the internal structure of a preferred embodiment thereof.

2. The Programming Model

The Runtime Library 66 runtime environment allows programs to run in parallel on the digital data processor 10. Parallel constructs handled are tiles, parallel sections, or parallel regions. Parallelism is implemented in all constructs with the use of threads. All code outside the parallel construct is executed serially by one of the program threads. All serial code is executed by the same, "master" program thread.

2.1 Implementation of Parallelism

Programs output by compilation system 60 are linked with the Runtime Library 66 to execute these constructs in parallel. Such a program will be called "Presto program." Programs that contain parallel constructs and are compiled with a "no parallel runtime switch" will treat the parallel construct directives as comments and will execute serially, with no Runtime Library 66 overhead.

Each parallel construct is executed by a group of threads, called a team, which has one or more members. Each team has one member who is designated a team leader, for purposes of synchronization. When the program starts, there is one thread that is designated the program leader. Runtime Library 66 will manage thread teams transparently to the user, but the user can control teams explicitly.

A thread may have one or more code segments to execute. Runtime Library 66 implements a number of strategies. If the parallel construct is a tile family, each thread has at least one, and more typically, many tiles to execute. In the parallel section and parallel region constructs, each thread has only one code segment to execute.

2.2 Transition Between Serial and Parallel Parts of the Program

All serial portions of the program are executed by a single thread, the program master. When a parallel construct is encountered, a group of threads is assigned to the construct. The beginning of the construct is a synchronization point for the group of threads, while the end of the construct is a synchronization point for the group master. Each group member begins the parallel portion as soon as the thread group is assigned and the group master has finished the preceding serial code; the group members must wait on the group master but not on the members.

At the end, the group master does not execute the code following the parallel portion until all group members have finished; the group master must wait on all members. During the serial portions of the program, all threads except the program master are idle.

The synchronization point at the end of the construct is placed at what is the known point of code dependency.

Parallel constructs may be nested. The general implementation approach is the same at each level; for each new construct, there is a local group of threads, with a local master.

2.3 Resource Allocation Among Parallel Constructs

Runtime Library 66 delegates much of the duty of load balancing among processors to the operating system ("OS") scheduler. Runtime Library 66 will influence resource allocation by choosing the number of threads to use for a parallel construct. The OS will manage resource allocation among the threads. There may be more or less threads than available processors at any moment.

2.3.1 Tiling

On tiling, Runtime Library 66 considers the amount of resources available, and for each tile family, uses n threads, where n is less or equal to the number of processors available to this program. The default is to use the maximum number of processors available; if the tile family is structured so that it is not worth using the maximum number, a smaller number of threads will be chosen. This algorithm is used regardless of nesting.

When using the GRAB strategy, Runtime Library 66 lets the scheduler handle all thread-processor bindings and affinity considerations.

When using the MODULO, WAVEFRONT, or SLICE strategy, Runtime Library 66 attempts to assume that the thread→processor binding is constant. Runtime Library 66 constructs and assigns tiles accordingly. This binding assumption makes it useful to let the scheduler know that Runtime Library 66 requires higher thread→processor stability on these kinds of threads.

3. INTERFACES

3.1 Runtime Library 66/Compilation System 60

The preprocessor 60a transforms the code enclosed by a parallel construct into a lexical subroutine. Creating the new subroutine allows Runtime Library 66 threads to run the same code in parallel. The compilation system 60 also generates calls to runtime routines which will set up and cause the parallel execution.

In the tile construct, the lexical subroutine is composed of the code enclosed by the TILE directives. One subroutine is created, and is called by each of the thread group members, with different loop bounds.

All variables visible to the code that becomes the "caller" of the lexical subroutine must be available to the subroutine itself. However, because the subroutine is called by a Runtime Library 66 routine, a mechanism is needed to patch the scoping. Among the information passed from the compilation system 60 to Runtime Library 66 is a pointer to the lexical subroutine and the efp (enclosing frame pointer) of the calling code. This enables Runtime Library 66 threads to call the subroutine with the appropriate scoping.

3.1.1 General Interface

Runtime Library 66 and the compilation system 60 use the following values for certain interface arguments:

```
boolean values: 0 = FALSE, 1 = TRUE
strategy values: 1 = GRAB, 2 = MODULO,
    3 = WAVEFRONT, 4 = SLICE, -1 = not specified
in general, -1 = not specified
sizes: 0 = entire iteration space,
    n = value of n
```

3.1.2 Start of Affinity Regions

When the compilation system 60 encounters an AFFINITY REGION user directive or when it recognizes a potential affinity region, it calls_pr_start affinity with information to initialize the affinity region workplan (from the compilation system 60 to region workplan). This only transfers affinity related information from the compilation system 60 to Runtime Library 66's internal data structures, and does not trigger any parallel execution. Note that this interface applies to both lexically separate tile families and tile families that are nested within an enclosing loop and that Runtime Library 66 does not differentiate between the two.

The user directive is:

```
c*ksr* AFFINITY REGION ( <index and bounds>
    [tilesize=<size_list>]
    [strategy={GRAB, MOD,WAVE,SLICE}],
    [numthreads=<value> | teamid=<team id value>],
                [intercall={0,11}],
                [order=<list>])
```

This results in the compiler making a call to:

```
void_start_affinity( num_indices,
    code_size,
    numthreads,
    strategy,
    tile_size_spec,
    teamid,
    intercall,
    order_num,
    dependency vector, --as many #'s order_num
    low bound values, --as many #'s as num_indices
    high bound values, --as many #'s as num_indices
    affinity values, --as many #'s as num_indices
    tile_size_vals), as many #'s as num_indices
long num_indices;
long code_size;
long numthreads;
long strategy;
long tile_size_spec;
long teamid,
long intercall,
long order_num:
va_dcl;
{
}
```

Arguments are:

Num_Indices (long): This is the number of indices listed by the user. The compilation system 60 checks that the user specified indices are a subset of the intersection of all indices used by included tile families.

If there is no common set of indices The compilation system 60 will produce a warning message to the user that the affinity region was not possible, and will not issue the call to _pr_start affinity.

Code_size (long): Average code size across all the tile families covered by the affinity region.

Numthreads (long): −1=not specified, 0 . . . n=value passed by user. Number of threads to be used by the tile families within this affinity region.

Strategy (long): Strategy to be used by all tile families within the affinity region. Scope only extends to affinity region. −1=not specified, 1=GRAB, 2=MODULO.

Tile_size_spec (long): 0 if tile size not passed by user, 1 if passed by user.

Teamid (long): −1 if not specified, otherwise the team id passed by the user.

Intercall: −1 if not specified, other 0 or 1.

Order_num (long): Number of dependency vector values provided. Note that the user may specify some dependency values.

Dependency_vector [order_num] (long[ ]): Dependency values across all tile families covered by the affinity region. This is the union of all tile family specific dependency values. For example:

| Tile Directive | Compiler Generates Order_Num, Order Vector |
| --- | --- |
| c*ksr TILE(i,j,k, order={j,y}) | order_num=2, vector=(2,3) |
| c*ksr TILE((i,j, order={i,j}) | order_num=2, vector=(1,2) |
| c*ksr TILE(j,k)<br>because the num_indices=1,<br>order_num=1<br>dependency vector={1} | order_num=0 |

Another example:

| | |
| --- | --- |
| c*ksr TILE(i,j,k, order={j,k}) | order_num=2, vector={2,3} |
| c*ksr TILE(i,j,k, order={i,j}) | order_num=2, vector={1,2} |
| c*ksr TILE(i,j,k)<br>num_indices=3<br>order_num=3<br>dependency vector={1,2,3} | order_num=0 |

Dependency values are all positive numbers, unlike the dependency vector passed in the prexecute call. Director is ignored. If user specified any dependency values, pass that value for that index, otherwise, compilation system 60 calculates the value.

Low_bound[num_indices](long[ ]): the lowest low bound value for each index, across the affinity region. User specified.

High_bound [num_indices](long[ ]): Analogous to low bound, always provided by the user.

Affinity [num_indices](SSB_T): ssb values for each index covered by the affinity group. Valid ssb values for the compilation system 60 are NONE and SP. Section 6.4.1 on Ssb Calculation describes how ssbs are generated.

Tile_size_vals[num_indices](long[ ]): User specified tile size, passed directly from fortran directive. Compilation system 60 will check that number of tile size values match value of num_indices. Tile size will only stay in effect for this one affinity region. See action on TILE directive for format of values.

3.1.3 End of Affinity Regions

When the compilation system 60 encounters an END AFFINITY REGION directive, or comes to the end of a compilation system 60-detected affinity region, it calls:

```
Void_pr_set_affinity_off( )
{
}
```

This does not trigger any parallel execution.

3.1.4 Set Directive

When the compilation system 60 encounters a SET directive, the appropriate Runtime Library 66 runtime parameters are changed. The compilation system 60 checks that this directive is not used within a parallel construct. This will not trigger any parallel execution.

The user directive is:

```
C*ksr*SET([PL_STRATEGY=(strategy value)],
         [PL_INFO = {0,1}],
         [PL_NUM_THREADS = (value)],
         [PL_STATISTICS = {0,1}],
         [PL_LOG = {0,1}],
         [PL_VISUAL = {0,1}],
         [PL_SYNC_DELAY = (value)],
         [PL_MIN_INST_IN_TILE = (value)],
         [PL_ONE_SP_LONG = (value)],
         [PL_TWO_SP_LONG = (value)])
Compilation system 60 makes call to:
```

```
void_pr_set (num_variables,
             variable/user value pairs,)
long val;
va_dcl_- (each value is a long)
{
}
```

Each variable/user value pair is a pair of two long words. The variable value to pass is defined in an include file "Runtime Library 66.h" and is the keyword defined with two underscores before the name. The compilation system 60 must parse the variables to generate the variable values. For example:

```
#define_PR_STRATEGY 0            /*use
this for variable value if keyword was
PR_STRATEGY*/
```

The compilation system 60 will pass {0,1,2,3,4} for the PL_STRATEGY values, where the strategy values map the following way. (NONE=0, GRAB=1, MODULO=2, WAVEFRONT=2, SLICE=4). These are defined in Runtime Library 66.h. For all other parameters, the user value is that value passed by the user in the directive.

3.1.5 Start of a Tile Family

When the compilation system 60 encounters a TILE directive, it calls a Runtime Library 66 routine that set up tiling information and starts parallel execution. The user directive is:

```
C*ksr TILE(<index>, (primary set),
         [tilesize=<size list],
         [strategy={GRAB,MOD,WAVE,SLICE}],
         [numthreads=<val> | teamid=<team_id>],
         [aff_member={0,1}])
```

This results in the compilation system 60 making a call to:

```
void
_pr_execute_tiles (family_name,
                   code_size,
                   frame_pointer,
                   num_indices,
                   strategy,
                   tile_size_spec,
                   teamid,
                   order,
                   this_level_ar,
                   reduction_ptr,
                   psc_ptr,
     numthreads,
     aff_member,
     dep_vector,          --as many #'s as order,
     low_bound,           --as many #'s as num_indices,
     high_bound,          --as many #'s as num_indices,
     loop_stride,         --as many #'s as num_indices,
     affinity,            --as many #'s as num_indices,
     areg_map,            --as many #'s as num_indices,
     tile_size_vals)      --as many #'s as num_indices,
int    (*family_name)( ), (*reduction_ptr)( )
       (*psc_ptr)( );
long   code_size;
char   *frame_pointer;
long   num_indices, strategy, tile_size_spec, teamid,
       numthreads, aff_member;
long   order, this_level_ar;
va_dcl - (each value is a long)
{
}
```

Arguments are:

Family_name(int*): pointer to subroutine holding tile body.

Code_size(long): number of instructions in tile body.

Frame_pointer(char*): Enclosing frame pointer of caller for tile body subroutine.

Num_Indices(long): number of loop indices.

Strategy(long): −1=not user specified, 1=GRAB, 2=MODULO. Runtime Library 66 error checks that strategy is a valid value. Strategy stays in effect for this one tile family.

Tile_size_spec(long): 0 if tile size not passed by user, 1 if passed by user.

Teamid(long): −1 if not specified, otherwise the team_id passed by the user.

Order (long): number of order vector values.

This_level_ar(long): 0 if this tile family is not lexically enclosed within an affinity region, 1 if this tile family is lexically within an affinity region.

Reduction_ptr(int*): pointer to subroutine holding code to finish any reductions within the tile body. If this pointer is not null, each thread participating in this tile family executes this call when it has finished its share of work. If this point is null, there is no effect.

Psc_ptr(int*): pointer to subroutine for runtime support of privately shared common. If this pointer is not NULL, the following four steps are taken:

1) the team leader will call_pr_psc init_mwu, 2) each thread will call_pr_psc_use_mwu with _sc_ ptr as an argument, leave, and 3) then each thread calls_pr_$_{psc}$_helper leave, and 4) the master thread calls_pr_psc master_leave.

Numthreads(long): −1=not specified, 0 . . . n-value passed by user. Number of threads to be used by the tile family.

Aff_member(long) −1=not specified, 0=user doesn't want this family to be included in the enclosing affinity region, 1=tile family should be executed within the affinity region.

Dep_vector(long[ ]): Values of indices that have dependencies. Vector values are negative if the dependency is backward, positive if the dependency is forward. For example, a vector value of −3 means the third loop index, counting from 1, has a backward dependency.

Low-bound(long[ ]): Low bound values for all loop indices.

High_bound(long[ ]): High bound values for all loop indices.

Loop_stride(long[ ]): Loop stride values for all loop indices.

Affinity[num_indices](SSB_T): ssb values for each index covered by the tile family. Valid ssb values for the compilation system 60 are NONE and SP. Section 6.4.1 on Ssb calculation describes how ssbs are generated.

Areg_map[num_indices](long[ ]): Only valid if this tile family is in the middle of an affinity region declared by the user or identified by the compilation system 60. For each loop index of the tile family: −1: if th loop index not used for the affinity region, n: if this loop index corresponds to the nth loop index of the affinity region.

For example:

```
C*ksr    START AFFINITY REGION (i,j)
C*ksr*   TILE (i,j,k) - mapping is {0,1,−1}
C*ksr*   END TILE
C*ksr*   TILE(J) - mapping is {1}
C*ksr*   END TILE
C*ksr*   TILE (j,i) - mapping is {1,0}
C*ksr*   END TILE
C*ksr*   END AFFINITY REGION
```

Tile_size_vals[num_indices](long[ ]): User specified tile size, passed directly from fortran directive. Compilation system 60 will check that number of tile size values match value of num_indices. Tile size will only stay in effect for this one tile family.

```
C*ksr* TILE(i,j, tilesize=(i:16) -- results in error
C*ksr* TILE(i,j, tilesize=(j:10,i:16)) --
        numindices=2, tilesize={16,10}
```

Valid values for tilesize are constants, variables and "*".

For example:

n: where n is some constant, x: where x is some variable

*: tile size should be the entire iteration space in this dimension.

For example, the following tile directives are valid:

```
TILE(i,j, tilesize=(i:15, j:10))--tilesize={15,10}
TILE(i,j, tilesize=(i:x, j:10))--(x==4)tilesize={4,10}
TILE(i,j, tilesize=(i:*, j:10))--(bounds for i are
    2->10,tilesize={8,10}
``` areg_shift[num_indices](long[ ]): Only valid if this tile family is in the middle of an affinity region declared by the user or identified by the compilation system 60. Used to keep affinity alignment when the tile families use indices shifted over by a constant value.

For each loop index of the tile family: n=amount added to use of this index

For example:

```
C*ksr* AFFINITY REGION (i,j)
C*ksr* TILE(i,j) -areg_shift is {0,0}
    do i=1,10
    do j=1,10
    a (i,j)=x
    enddo
    enddo
C*ksr* END TILE
C*ksr* TILE(i,j) -areg_shift is {1,2}
    do i-1,10
    do j=1,10
    a(i+1,j+2)=x
    enddo
    enddo
C*ksr* END TILE
C*ksr* TILE(i,j)
    do i-1,10 -can't reconcile this,
    areg_shift is {0,0}
    do j=1,10
    a(i,j)=x
    a(i,j+1)=y
    enddo
    enddo
C*ksr* END TILE
C*ksr* TILE(i,j)
    do i-1,10 -can't reconcile this,
    areg_shift is {0,0}
```

```
        do j=1,10
        a(i,j)=b(i,j+1)
        enddo
        enddo
C*ksr* END TILE
C*ksr* END AFFINITY REGION
```

3.1.6 Execution of a Tile Family

Runtime Library 66 executes the tile family by calling a lexical subroutine containing the tile body code with the bounds of the iteration space covered by this tile, and a boolean value indicating whether the last value of the loop indices is needed. The order of arguments is low bound and high bound of each index, in order, followed by last-value-needed. This is triggered by the compilation system 60's call to_pr_execute_tiles.

3.2 Interfacing Runtime Library 66 with the Operating System

Runtime Library 66 delegates much of the responsibility for load balancing threads to the Operating System ("OS") scheduler, as described above. Runtime Library 66 does have some communication with the scheduler on the following topics.

3.2.1 Available Processors

Runtime Library 66 uses information on the number of available processors for a program when generating tiles. At startup, Runtime Library 66 either asks for a set number of processors, if the user has specified a number, or will ask for the "MAX" number of available processors. The OS scheduler replies with the actual number that are available.

There may be further qualifiers, such as the specification of a minimum number of processors, the request that processors be on a single Ring0, or the request not to use io cells.

If the scheduler has the ability to expand or contract processors sets, Runtime Library 66 will check the scheduler at the beginning of every n parallel constructs (n is configurable) to update it's count of available processors.

3.2.2 Scheduler Hints/Priority

The scheduler uses application-supplied information to affect resource allocation among thread. The scheduler implements a sleep/wakeup mechanism that enables applications to affect the descheduling of threads.

3.2.2.1 Synchronization

Runtime Library 66 synchronization is accomplished with the mutex and barrier constructs supplied by the pthreads library.

3.2.2.2 Idle

A thread is "running" if it is executing the construct body or serial code, and "sync'ing" if it has entered a synchronization routine. At all other times, a thread is "idle". A thread can become idle if it is a member of a thread group that will execute several parallel constructs, and it is not the group master, and it has finished entering the construct barrier. An idle thread will spin in a loop for a configurable amount of time and then issue a sleep call. The thread will be woken up by the group master when it is time to leave the barrier.

4. TILING

4.1 Generating tile sizes

Tile size and shapes are determined by the a combination of inputs:

1. Memory allocation of the iteration space and the tile family access of the memory (as described by the ssb of the tile family). The ssb is generated by the compilation system 60.
2. Consideration of the minimum desirable tile size (as described by the PL_MININST_PER_TILE environment variable).
3. Dependencies on the tile indices.

Runtime Library 66 makes a first pass at the tile size using the ssb and dependency information to making the minimum size tile. The two possible compilation system 60 calculated ssb values are NONE and SP. This first pass amends the ssb values with dependency information; if there is a dependency on this index and there are no other dependencies in the tile, the ssb is converted to MAX, in order to avoid dependency synchronization. If there is a dependency on this index but there are more dependencies on the tile, an intermediate size of SP is chosen.

The following truth table describes the algorithm for generating the first pass tile size template.

| x) = don't care | | | |
|---|---|---|---|
| Compiler Ssb Value | Dependency On this Idx | More than 1 Dpdncy in Tile Family | Presto Ssb Value |
| NONE | FALSE | x | NONE |
| NONE | TRUE | FALSE | MAX |
| NONE | TRUE | TRUE | SP |
| SP | FALSE | x | SP |
| SP | TRUE | FALSE | MAX |
| SP | TRUE | TRUE | SP |

Runtime Library 66 takes this Runtime Library 66 ssb value to generate minimum tile sizes. If the ssb value for an index is MAX, the tile size in that dimension will be the entire iteration space in that dimension. If the ssb value is NONE, the size of that dimension will be the minimum of one iteration. If the ssb is SP, the tile size of that index will be 32. After this first pass, there should be a tile shape that obeys dependency and subpage boundary considerations and is the minimum size.

Runtime Library 66 then makes a second pss that compares the tile size to the minimum required size for the tile. If the tile family is executed under the slice strategy, this minimum size is equal to the number of instructions in the tile family divided by the number of threads in the executing team. Otherwise, the minimum size is specified by the environment variable specifying the minimum size of he tile in terms of instructions (PL_MIN_INST_PER TILE).

The tile is stretched until it satisfies this minimum size, keeping within the constraints of the SSB value. If one side of the tile is already the entire iteration space, there is nothing further to do with that dimension. If this size has an SSB value of SP, the tile will be stretched in multiples of 32. If this side has an SSB value of NONE, the tile size in that dimension will be stretched in increments of 1.

Runtime Library 66 chooses indices to stretch the tile in the following order:

If the tile family strategy is WAVEFRONT, the column index is stretched first, followed by the subtile index. The objective is to increase tile sizes in the dimensions where there are data dependencies, to minimize synchronization between tiles.

Indices with SSB values of SP are chosen next, to optimize affinity. These indices are stretched in turn. For example, if a tile family has indices ij, and k, with indices i and j with ssb values of SP, Runtime Library 66 will stretch i, then j, then i, etc., until either i and/or j is exhausted, or the tile has reached its minimum size.

Indices with SSB values of NONE are chosen last.

4.2 Tile/thread assignment

There are several algorithms, called strategies, to assign tiles to threads. Of the four described above, the grab strategy uses load balancing considerations, while the modulo, wavefront and slice strategies uses data affinity considerations. The wavefront strategy is also designed to execute tile families with ordering requirements with as much parallelization as possible.

4.2.1 Grab Strategy

In the grab strategy, tiles are assigned to threads with a pure first come, first serve algorithm.

4.2.2 Modulo Strategy

In the modulo strategy, tiles are evenly distributed among threads. The mapping is ((tilenumber % total_tiles)== thread id). This can modified with respect to parallel sections, so that thread id will be the local group thread id.

In addition, if the modulo strategy is used in conjunction with affinity regions, Runtime Library 66 attempts to have each thread execute tiles which fall within the iteration space that thread has used in previous tile families, in order to maintain data affinity. Runtime Library 66 looks only at the iteration space, and not at the data space, assuming that the iteration space→data space mapping is constant across all tile families within the affinity region.

Runtime Library 66 is able to remember the iteration space assigned to each thread and uses that to normalize the ((tile_number % total_tiles==thread id) mapping across tile families.

4.2.3 Data Dependent Strategies
4.2.3.1 Correctness

Data dependencies create an ordering requirement when executing tiled code. Tiles are executed in a sequence that will not defy the direction of dependency in order to guarantee correct results.

4.2.3.2 Performance

Since data dependencies impose ordering restrictions on tiles, tiling in the direction of a dependency is often not worthwhile when considered only in the context of that tile family. For example, a one dimensional iteration space with a dependency must be executed in strict serial order, and the overhead required to serialize the tiles is a waste. However, performance considerations of the entire program may lead Runtime Library 66 to consider tiling in the direction of a dependency.

Affinity is an important factor in choosing tiling strategies that may lead to the decision to tile in a dependency. The overhead of serializing tiles may be worthwhile if it maintains affinity of data for other tile families in the program that don't have restrictions and can be completely parallelized. This is true independent of data dependency; the sgefa routine of linpack is a case where the first, smaller 1D iteration space is tiled to be consistent with the second, 2D iteration space.

In addition, tiling a dependent dimension may also present the opportunity to use a partially serialized tiling ordering. In such cases, tiles are organized in groups, which must be executed serially. However, within the groups, the tile can be executed in parallel. A partially serialized tiling ordering can only be used when the iteration space is more than one dimension.

4.2.3.3 Wavefront Strategy

Runtime Library 66 will tile data dependencies in order to preserve affinity and to use partially serialized tiling ordering. The tiling ordering to be implemented will be the wavefront ordering.

5. Affinity

An affinity region is a collection of tile families which Runtime Library 66 attempts to execute in a fashion so as to avoid data contention and movement. When Runtime Library 66 encounters an affinity region, it receives information which summarizes the iteration space covered by the tile families within the region. Runtime Library 66 does not need to distinguish between lexically separate tile families and tile families within an outer loop. Runtime Library 66 uses this information to generate a tile size template and tiling strategy which is used as for all tile families within the region, allowing a thread to access the same portion of the iteration space for each tile family.

Note that affinity regions are useless if the tiling strategy chosen is the pure grab strategy.

Affinity regions may be nested. Each new affinity region generates a new thread group, and uses its own tiling workplan.

5.1 Common Index Set

A tile size template is created by looking at a set of loop indices, their dependencies, and their ssb's. The set of loop indices of interest are those used for all of the tile families in the affinity region. It must be possible for all the loopnests in an affinity region to be tiled on the same set of indices. This is the "common index set" rule. The common index set is a subset of the intersection of the indices used by the tile families within an affinity region. This is necessary because the affinity oriented strategies need an iteration→processor mapping function which determines which processor executes the tile. If the number of tiled indices varies loopnest to loopnest, this mapping will fail.

For example:

The common index set is "i" for the following example:

```
----start affinity region---
do i=1,10
    do j=1,10
        a(i,j,5) = x;
    enddo
enddo
do i=1,10
    do k=1,10
        a(i,4,k) = x;
    enddo
enddo
----end affinity region---
```

In the following example, it is necessary to change the code so that a common index set can be identified. Here is the original:

```
----start affinity region--
do n=2,99
    do m=2,199
        do l=2, 1999
            u(l,m,n) = xx;
        enddo
    enddo
enddo
do n=2, 99
    do m=2, 199
        u (1,m,n) = xx;
        u (2000,m,n) = xx;
    enddo
enddo
do n=2,99
    do l=2, 1999
        u(l,1,n) = xx;
    enddo
enddo
do m=2, 199
    do l=2, 1999
        u(l,m,1) = xx;
        u(l,m,100) = yy;
    enddo
enddo
----end affinity region---
```

Here is the changed code. The most optimal version, to create a common index set of (n,m) is:

```
                ----start affinity region---
                do n=2, 99
                  do m=2, 199
                    do 1=2, 1999
                      u(1,m,n) = xx;
                    enddo
                  enddo
                enddo
                do n=2, 99
                  do m=2, 199
                    u(1,m,n)=xx;
                    u(2000,m,n)=xx;
                  enddo
                enddo
C               Add loop for m
                do n=2, 99
                  do 1=2, 1999
                    do m=1,1
                      u(1,1,n) = xx;
                    enddo
                  enddo
                enddo
C       Add loop for n, also add conditional so that
C       statement is only done once, on one
C       processor. Runtime Library 66 will make sure
C       that the iteration goes to the right
C       processor, but cannot assess memory accesses
C       hard coded inside the loop.
C       An alternative is to split to loop into two
C       loops that look like the one above, with
C       only one statement in each loop. The
C       tradeoff is the addition of a new tile family
                do m=2, 199
                  do 1=2, 1999
                    do n=1,100,100
                      if (n .eq. 1)
                        u(1,m,1) = xx;
                      if (n .eq. 100)
                        u(1,m,100) = yy;
                    enddo
                  enddo
                enddo
                ----end affinity region---
```

5.2 Affinity regions and Subroutine Calls

The default requirement is that all tile families within an affinity region declaration must be in the same lexical level as the affinity region declaration. All tile families within the affinity declaration but in another subroutine will be run by another thread group (therefore, possibly another set of processors and without the same affinity). The motivation is that affinity region declarations require the compilation system 60 to scan all tile families within the declaration and generate summaries of the tile family characteristics. Subroutines are not accessible to the compilation system 60 and cannot be included in the affinity region information.

However, the user can use the "intercall" parameter of the AFFINITY REGION directive to override this requirement. The compilation system 60 will not be able to scan the tile families that are not at the same lexical level, and if the user does not provide detailed information through the other parameters, the affinity region may not be optimally set up. An example of the default behavior:

```
c*ksr* AFFINITY REGION(i:1,n)
c*ksr* PTILE(i,j)
      do i=1,n
        do j=1, n
          ...
          call foo ( )   -- Call #1: run by
                            another thread group
        enddo
      enddo
      call foo( )    #2: run by another thread
                            group
c*ksr* PTILE(i)
      do i=1,n
        ...
      enddo
c*ksr* END AFFINITY REGION
```

6. Runtime Library 66 Architecture

6.1 Use of Synchronization

Runtime Library 66 requires synchronization of its member threads at various points during the execution of a Presto program. The synchronization mechanisms used are critical sections and barriers. Runtime Library 66 use the pthread mutex calls to implement critical sections and the pthread barrier calls to implement barriers.

6.1.1 Beginning and end of a parallel construct (barrier)

At the beginning of a tile family or parallel section, all threads participating in the parallel construct are held in a barrier until the thread group master finishes all serial code. At the end of the execution of that construct, all member threads re-enter. The master thread will not execute code following the parallel construct until all member threads are entered the barrier.

There may be numerous barriers declared if the program has a nesting of parallel constructs. A thread may be a member of several barrier groups if it is participating in several nested constructs.

6.1.2 Locking during the grab strategy (critical section)

The grab strategy requires all member threads to update a marker data structure to get the next available tile. This marker data structure is held in a lock.

6.1.3 Locking the thread group id (critical section)

Each new thread group is given a unique id, used to identify parallel constructs for visualization, logging, and tagging output. The current group id is held in a data lock and incremented by each new thread group.

6.1.4 Locking during thread group creation and disbanding (critical section)

Runtime Library 66 creates pthreads and keeps them hanging around in an idle pool. When a thread group is created and disbanded, threads must be assigned in or out of the idle pool. This is synchronized by holding the number of available idle threads in a data lock.

6.1.5 Locking during creation/destruction of teams (critical section)

Runtime Library 66 allows the user to create permanent teams that live beyond a single parallel construct. These teams are held in a global linked list. Creation and destruction of teams is synchronized through the lock _pr_team_ lock;

6.1.6 Locking for storage of statistics information (critical section)

Runtime Library 66 may be configured to collect statistical performance information. This data is kept in global variables which must be written in a critical section.

6.2 Use of Threads

6.2.1 Thread Teams

A Presto program starts out with one pthread, known as the program master. At startup, Runtime Library 66 creates additional pthreads, and keeps them in an idle pool of available threads. As the program executes, Runtime Library 66 creates pthread teams to handle new parallel constructs encountered. Thread groups may handle either one or more parallel constructs. When teams are disbanded, the pthread members are returned to the Runtime Library 66 idle pool. This idle pool is designed to minimize the high cost of pthread creation.

Parallel sections and regions: By default, a new thread team is created for each new parallel section. At the end of the section, the thread team is disbanded. If the user specifies a team for use in this construct, that team is used, and is not disbanded at the end of the construct.

Tile families no affinity region: a new thread team is created for each new tile family not enclosed in an affinity region unless a team is specified in the directive. At the end of the tile family, the new thread group is disbanded.

If a team is specified in the directive, that team is used and a new team is not created. A user specified team is not disbanded at the end of the construct.

Title families, within affinity regions: By default, a new thread group is created to execute all the tile families within an affinity region. If a team is specified with the affinity region directive, that team is used and a new team is not created. The thread team is kept alive across the tile families in order to preserve a uniform tile→thread mapping across the affinity region. The motivation is the assumption that threads will tend to remain on the same processors during the life of the thread. At the end of each affinity region, the new thread group is disbanded, unless it is a user-created and specified team.

A single thread may be a member of several thread teams if parallel constructs are nested.

6.2.2 Creating and Destroying Threads

A thread group is composed of a group master and 0 to n group slaves. A Presto program starts off with one thread, the program master. As thread groups are created, the current master becomes the group master of the new thread group, and the slaves are created. As thread groups are disbanded, the group slaves are returned to the idle pool.

This process extends to nested parallel constructs. Imagine a program with a series of parallel constructs nested two deep. At level 1, the program master creates a thread group and becomes the group master. At level 2, any slave that encounters another parallel construct creates a new thread group and becomes the level 2 group master. When the level 2 construct ends, the level 2 thread group is disbanded, and the group slaves are returned. The level 2 group master sheds its master identity and resumes its own identity as a level 1 slave or master. When the level 1 thread group is disbanded, all group slaves are returned except for the group (and program) master.

6.3 Data Structures
6.3.1 Global to program

Environment variables: All user-interface environment variables are shared globals to the program and are applicable to all parallel constructs.

Statistics information: These measure instruction counts by various categories are stored in shared global variables.

_pr_master_thread: id of program master, for UDB support. Shared global variables.

_pr_fp: File pointer used for output at end of program. Needed because of treatment of standard out by fortran environment. Shared global.

_pr_t_state: Running, idle, or sync state, for udb support. Private global.

_pr_curr_mcb_p: Pointer to current mcb, for udb support. Private global.

_TEAM_MEM_ID: this thread's id in its current team. Private global.

_POOL_ID: this thread's current id for the Runtime Library 66 idle thread pool. Private global.

_MY_THREAD_ID: this thread's pthread id. Private global.

SUMMARY

The foregoing describes an improved digital data processing system meeting the aforementioned objects. Particularly, it describes an improved parallel processor that executes iterative sequences by dividing them into subtasks and allocating those to the processors. This division and allocation is conducted in such a manner as to minimize data contention among the processors and to maximize locality of data to the processors which access that data.

Those skilled in the art will appreciate that the embodiments described above are exemplary only, and that other apparatuses and methods—including modifications, additions and deletions—fall within the scope and spirit of the invention.

By way of example, it will be appreciated that the functionality of the preprocessor 60*a* may be incorporated into the compiler 60*b* itself. Thus, eliminating the need for a separate preprocessing step.

It will also be appreciated that the techniques described above may be applied to massively parallel systems and other multiprocessor systems.

By way of further example, it will be appreciated that differing data structures storing tiling information may be used. That equivalent, but varied, procedures may be used to parallelize and execute the iterative sequences. And, by way of further example, that further tiling directives may be added without changing the spirit of the invention.

In view of the foregoing, what we claim is:

1. In a parallel processor digital data processing apparatus of the type having a plurality of processing units, each for executing instructions, memory means coupled to said processing units for storing at least one of data and instructions, interprocessor communication means coupled to said processing units for transferring information therebetween, the improvement for processing an iterative sequence of instructions wherein:

A. said memory means includes means for storing a tiled sequence of instructions representing the iterative sequence, and each of said plural processing units includes means for signalling its availability to execute said tiled sequence over a portion of an iteration space associated with said iterative sequence, said portion being referred to as a tile, B. said apparatus includes next-tile means coupled to said processing units for responding to each of at least selected such signallings by those processing units for generating a signal representing boundaries of a tile over which to execute said tiled sequence, wherein each such tile does not overlap any other tile, wherein each such tile covers a portion less than a whole of said iteration space, and wherein all such tiles together cover said iteration space, C. each said processing unit including means for responding to a boundary-representative signal generated in response to signalling by that processing unit for executing said tiled sequence over the corresponding tile.

2. In a digital data processing apparatus according to claim 1, the further improvement comprising A. tile-build means for generating a tile-shape signal indicative of one or more dimensions of said boundary-representative signals, in view of dependency between the corresponding tiles, B. wherein said tiled sequence includes one or more instructions for write-type access of a datum stored in said memory means, C. said memory means includes
   i) a plurality of memory elements, each for storing at least one of data and instructions, each said memory element being coupled to an associated one of said processing units, and
   ii) memory management means coupled with said memory elements for selectively transferring information therebetween, and D. said next-tile means includes means for generating said boundary-representative signals as a function of said tile-shape signal.

3. In a parallel processor digital data processing apparatus according to claim 2, the further improvement wherein said tile-build means includes means for generating said tile-shape signal indicative of dimensions of said boundary-representative signals that minimize the number of individual datum subject to write-type access during execution of different ones of corresponding tiles.

4. In a parallel processor digital data processing apparatus according to claim 2, the further improvement wherein said tile-build means includes means for generating a tile-shape signal indicative of dimensions of said boundary-representative signals that minimize the number of individual datum subject to write-type access by plural concurrently-executing ones of the processing units.

5. In a parallel processor digital data processing apparatus according to claim 2, wherein
   A. first and second tiles include any of
      i) an instruction in said first tile that accesses for write-type access a selected datum, and a instruction in said second tile that subsequently accesses for read-type access that same datum,
      ii) an instruction in said first tile that accesses for read-type access a selected datum, and an instruction in said second tile that subsequently accesses for write-type access that same datum,
      iii) an instruction in said first tile that accesses for write-type access a selected datum, and an instruction in said second tile that subsequently accesses for write-type access that same datum, and
   B. said tile-build means includes means for generating a tile-shape signal indicative of dimensions of said boundary-representative signals that minimizes dependence of execution of said second tile upon execution of said first tile with respect to their respective accessing of said selected datum.

6. An apparatus according to claim 2, wherein said tile-build means includes means for generating an affinity signal representative of a tile execution sequence that minimizes a transfer of a data subject to any of read-type and write-type access during execution of successive tiles by different processing units.

7. In a digital data processing apparatus according to claim 2, the further improvement wherein said tile-build means comprises tile-shape means for generating said tile-shape signal as a function of at least one of
   i) an affinity signal representing a tile execution sequence that minimizes a transfer of a data subject to any of read-type or write-type access by successive executions of said tiles by different ones of said processing units,
   ii) a dependency direction of said tiled sequence,
   iii) a processing cost associated with execution of said tiled sequence,
   iv) a size of said iteration space,
   v) a number of processing units available for execution of said tiled sequence, and
   vi) an affinity region signal indicating that the tiled sequence is to be executed within an iteration space defined by a plurality of tile sequences.

8. In a parallel processor digital data processing apparatus according to claim 1, the further improvement wherein
   A. said next-tile means includes means for generating successive ones of said boundary-representative signals as a function of at least one of
      i) a tile-shape signal indicative of one or more dimensions of said boundary-representative signals,
      ii) a tile-strategy signal indicative of at least one of a sequence and manner of assigning tiles to said processing units,
      iii) an affinity region signal indicating that the tiled sequence is to be executed within an iteration space defined by a plurality of tile sequences,
   B. said apparatus comprises tile-strategy means for generating said tile-strategy signal, and
   C. wherein said iteration space is defined by a plurality of indices.

9. In a parallel processor digital data processing apparatus according to claim 8, the further improvement wherein said tile-strategy means includes selectively actuable slice means for
   i) generating a tile-shape signal indicative of boundary-representative signals dividing the iteration space by a number of processing units allocated to said execution with respect to one of said indices and spanning the iteration space with respect to the others of those indices, wherein the number of respective tiles is equal to that a number of available processing units, wherein those tiles are substantially equal in size, and
   ii) generating a tile-strategy signal indicative of generation of the respective tiles so as to cause one each of them to be executed by a respective one of the available processing units.

10. In a parallel processor digital data processing apparatus according to claim 9, the further improvement wherein said tile-strategy means includes means for actuating said slice means in instances in which
   i) data subject to access during execution of any such tile does not depend on that modified during execution of any other such tile, and
   ii) no substantial quantity of data subject to any of read-type and write-type access by one such tile is also subject to any of read-type and write-type access by another such tile.

11. In a parallel processor digital data processing apparatus according to claim 9, the further improvement comprising means for actuating said slice means in response to a user-supplied signal.

12. In a parallel processor digital data processing apparatus according to claim 8, the further improvement wherein said tile-strategy means includes selectively actuable modulo means for
   i) generating boundary-representative signals to divide the iteration space in fixed-length increments along all of said indices, and
   ii) generating a tile-strategy signal indicative of assignment of the respective tiles based on a modulus of a numerical identifier associated with each of the available processing units and a numerical identifier associated with each of the tiles.

13. In a parallel processor digital data processing apparatus according to claim 12, the further improvement wherein said tile-strategy means includes means for actuating said modulo means in instances in which
   i) data subject to access during execution of any such tile does not depend on that modified during execution of any other such tile,
   ii) no substantial quantity of data subject to any of read-type and write-type access by one such tile is also subject to any of read-type and write-type access by another such tile, and
   iii) re-use of data subject to any of read-type or write-type access by a processing unit executing a plurality of tiles is maximized, even in the presence of a change of a size of said iteration space.

14. In a parallel processor digital data processing apparatus according to claim 12, the further improvement comprising means for actuating said modulo means in response to a user-supplied signal.

15. In a parallel processor digital data processing apparatus according to claim 8, the further improvement wherein said tile-strategy means includes selectively actuable wavefront means for
   i) generating boundary-representative signals dividing the iteration space along one or more of said indices, wherein data subject to access during execution of at least selected tiles depends on that modified during execution of another tile, and wherein those tiles have a dependency direction,
   ii) generating a tile-strategy signal indicative of a sequence of generation of the respective tiles in accord with that dependency direction.

16. In a parallel processor digital data processing apparatus according to claim 15, the further improvement wherein said tile-strategy means includes means for actuating said wavefront means wherein data subject to access during execution of at least one such tile depends on that modified during execution of another such tile.

17. In a parallel processor digital data processing apparatus according to claim 15, the further improvement comprising means for actuating said wavefront means in response to a user-supplied signal.

18. In a parallel processor digital data processing apparatus according to claim 8, the further improvement wherein said tile-strategy means includes selectively actuable modulo/wavefront means for
   i) generating boundary-representative signals to divide the iteration space in fixed-length increments along all of said indices, wherein data subject to access during execution of at least a selected tile depends on that modified during execution of one or more other tiles, and wherein said tiles have a dependency direction, and
   ii) generating a tile-strategy signal indicative of assignment of the respective tiles based on a modulus of a numerical identifier associated with each of the available processing units and a numerical identifier associated with each of the tiles, and on that dependency direction.

19. In a parallel processor digital data processing apparatus according to claim 18, the further improvement wherein said tile-strategy means includes means for actuating said modulo/wavefront means in instances in which
   i) data subject to access during execution of at least one such tile depends on that modified during execution of one or more other such tiles, and
   ii) re-use of data subject to any of read-type or write-type access by a processing unit executing a plurality of tiles is maximized, even in the presence of a change of a size of said iterative space.

20. In a parallel processor digital data processing apparatus according to claim 18, the further improvement comprising means for actuating said modulo/wavefront means in response to a user-supplied signal.

21. In a parallel processor digital data processing apparatus according to claim 8, the further improvement wherein said tile-strategy means includes selectively actuable grab means for
   i) generating boundary-representative signals to divide the iteration space in fixed-length increments along all of said indices, and wherein data subject to access during execution of any tile does not depend on that modified during execution of any other tile, and
   ii) generating a tile-strategy signal indicative of a sequence of generation of the respective tiles, in response to said signalling for availability by said processing units, on a first-come-first-serve basis.

22. In a parallel processor digital data processing apparatus according to claim 21, the further improvement wherein said tile-strategy means includes means for actuating said grab means
   i) to facilitate load-balancing among processing units executing said tiles, and in instances when
   ii) no substantial quantity of data is subject to any of read-type and write-type access by one such tile is also subject to any of read-type and write-type access by another such tile.

23. In a parallel processor digital data processing apparatus according to claim 21, the further improvement comprising user-responsive means for actuating said wavefront means.

24. In a parallel processor digital data processing apparatus according to claim 1, the further improvement comprising
   A. means for providing an affinity region signal representative of one or more iteration sequences that access the same data,
   B. affinity region-build means for generating one or more of
      i) a signal representative of an iteration space in which one or more tiled sequences within the affinity region are to be executed,
      ii) a tile-shape signal representative of one or more dimensions of a boundary-representative signal,
      iii) a tile-strategy signal indicative of at least one of a sequence and manner of assigning tiles to said processing units, and
      iv) a team signal representative of a set of processing units by which the tiled sequences within the affinity region are to be executed to minimize a transfer of a data subject to any of read-type and write-type access during such execution.

25. In a parallel processor digital data processing apparatus according to claim 24, the further improvement wherein said affinity region-build means includes means for defining said iteration space to encompass one or more of the iteration spaces of the tile sequences in said affinity region.

26. In a parallel processor digital data processing apparatus according to claim 1, the improvement wherein said next-tile means includes means for generating said boundary-representative signals so as to maximize a locality of data subject to access during execution of one or more corresponding tiles, and to minimize contention for access to such data during such execution.

27. In a compiler of the type for translating program signals representative of a program, including an iterative sequence, in source code format into a code sequence of instructions in an object code format suitable for loading for execution by a plurality of parallel digital data processing units, the improvement comprising tiling means for responding to said iterative sequence in source code format for generating a tiled sequence of instructions representative thereof in object code format, and for further responding to that iterative sequence and to zero, one or more user-specified signals for generating one or more signals representing a framework for generating boundaries for plural tiles over which said tiled sequence is to be executed by said plurality of parallel digital data processing units, each such tile comprising a portion less than a whole of an iteration space associated with said iterative sequence.

28. In a compiler according to claim 27, wherein said compiler includes dependency means for determining a dependency direction of said iterative sequence and for generating a signal representative thereof, the further improvement comprising parallelization means for responding to instructions in said iterative sequence and to said dependency direction-representative signal for generating signals representative of one or more indexes in said iteration space over which to execute said tiled sequence.

29. In a compiler according to claim 28, the further improvement comprising

A. input means for accepting signals representative of a user-specified indexing of said iteration space, and B. means coupled with said input means and said parallelization means includes means for comparing said user-specified indexing signals with those generated by said parallelization means, and for generating a notification signal in the event of at least selected disagreement thereof.

30. In a compiler according to claim 28, the further improvement comprising optimizing means coupled to said parallelization means for generating one or more signals for use at runtime in optimizing parallel execution of said tiled sequence.

31. In a compiler according to claim 30, the further improvement wherein said optimizing means comprises means for generating an affinity signal representative of a tile execution sequence that minimizes a transfer of data subject to any of read-type or write-type access during execution thereof in plural tiles.

32. In a compiler according to claim 30, the further improvement wherein said optimizing means comprises means for generating an affinity region signal representative of one or more iteration sequences that access the same data.

33. In a compiler according to claim 32, the further improvement comprising

A. input means for accepting signals representative of a user-specified affinity region signal, and B. means coupled with said input means and said optimizing means includes means for comparing said user-specified affinity region signal with that generated by said optimizing means, and for generating a notification signal in the event of at least selected disagreement thereof.

34. In a compiler according to claim 30, the further improvement wherein said optimizing means comprises means for generating a signal representative of an estimate of a processing cost associated with execution of said tiled sequence.

35. In a compiler according to claim 27, the improvement comprising call-generating means for replacing said iterative sequence in said source code format with an instruction representative of a call to a code-dispatching subroutine.

36. In a compiler according to claim 35, the improvement comprising run-time means for executing said call-representative instruction for initiating execution of said tiled sequence by said processing units.

37. In a method of operating a parallel processor digital data processing apparatus of the type having a plurality of processing units, each for executing instructions, memory means coupled to said processing units for storing at least one of data and instructions, interprocessor communication means coupled to said processing units for transferring information therebetween, the improvement for processing an iterative sequence of instructions comprising the steps of:

A. storing a tiled sequence of instructions representing the iterative sequence, B. signalling, for each of said plurality of processing units, its availability to execute said tiled sequence over a portion of an iteration space associated with said iterative sequence, said portion being referred to as a tile, C. responding to each of at least selected such signallings by those processing units for generating a signal representing boundaries of a tile over which to execute said tiled sequence, wherein each such tile does not overlap any other tile, wherein each such tile covers a portion less than a whole of said iteration space, and wherein all such tiles together cover said iteration space, and D. each said processor responding to a boundary-representative signal generated in response to signalling by that processing unit for executing said tiled sequence over the corresponding tile.

38. In a method according to claim 37, the further improvement comprising the steps of A. generating a tile-shape signal indicative of one or more dimensions of said boundary-representative signals, in view of dependency between the corresponding tiles, B. wherein said tiled sequence includes one or more instructions for write-type access of a datum stored in said memory means, C. providing a plurality of memory elements, each for storing at least one of data and instructions, each said memory element being coupled to an associated one of said processing units, and selectively transferring information between said memory elements, and D. generating said boundary-representative signals as a function of said tile-shape signal.

39. In a method according to claim 38, the further improvement comprising generating said tile-shape signal indicative of dimensions of said boundary-representative signals that minimize the number of individual datum subject to write-type access during execution of different ones of corresponding tiles.

40. In a method according to claim 38, the further improvement comprising generating a tile-shape signal indicative of dimensions of said boundary-representative signals that minimize the number of individual datum subject to write-type access by plural concurrently-executing ones of the processing units.

41. In method according to claim 38, wherein
  A. first and second tiles include any of
    i) an instruction in said first tile that accesses for write-type access a selected datum, and a instruction in said second tile that subsequently accesses for read-type access that same datum,
    ii) an instruction in said first tile that accesses for read-type access a selected datum, and an instruction in said second tile that subsequently accesses for write-type access that same datum,
    iii) an instruction in said first tile that accesses for write-type access a selected datum, and an instruction in said second tile that subsequently accesses for write-type access that same datum, the further improvement comprising the step of
  B. generating a tile-shape signal indicative of dimensions of said boundary-representative signals that minimizes dependence of execution of said second tile upon execution of said first tile with respect to their respective accessing of said selected datum.

42. In a method according to claim 38, the further comprising generating an affinity signal representative of a tile execution sequence that minimizes a transfer of a data subject to any of read-type and write-type access during execution of successive tiles by different processing units.

43. In a method according to claim 38, the further improvement comprising the step of generating said tile-shape signal as a function of at least one of
  i) an affinity signal representing a tile execution sequence that minimizes a transfer of a data subject to any of read-type or write-type access by successive executions of said tiles by different ones of said processing units,
  ii) a dependency direction of said tiled sequence,
  iii) a processing cost associated with execution of said tiled sequence,
  iv) a size of said iteration space,
  v) a number of processing units available for execution of said tiled sequence, and
  vi) an affinity region signal indicating that the tiled sequence is to be executed within an iteration space defined by a plurality of tile sequences.

44. In a method according to claim 37, the further improvement comprising the steps of
  A. generating successive ones of said boundary-representative signals as a function of at least one of
    i) a tile-shape signal indicative of one or more dimensions of said boundary-representative signals,
    ii) a tile-strategy signal indicative of at least one of a sequence and manner of assigning tiles to said processing units,
    iii) an affinity region signal indicating that the tiled sequence is to be executed within an iteration space defined by a plurality of tile sequences,
  B. generating said tile-strategy signal, and
  C. wherein said iteration space is defined by a plurality of indices.

45. In a method according to claim 44, the further improvement comprising selectively actuable slice means for executing the steps of
  i) generating a tile-shape signal indicative of boundary-representative signals dividing the iteration space by a number of processing units allocated to said execution with respect to one of said indices and spanning the iteration space with respect to the others of those indices, wherein the number of respective tiles is equal to that a number of available processing units, wherein those tiles are substantially equal in size, and
  ii) generating a tile-strategy signal indicative of generation of the respective tiles so as to cause one each of them to be executed by a respective one of the available processing units.

46. In a method according to claim 45, the further improvement comprising the step of actuating said slice means in instances in which
  i) data subject to access during execution of any such tile does not depend on that modified during execution of any other such tile, and
  ii) no substantial quantity of data subject to any of read-type and write-type access by one such tile is also subject to any of read-type and write-type access by another such tile.

47. In a method according to claim 45, the further improvement comprising means actuating said slice means in response to a user-supplied signal.

48. In a method according to claim 44, the further improvement comprising providing selectively actuable modulo means for executing the steps of
  i) generating boundary-representative signals to divide the iteration space in fixed-length increments along all of said indices, and
  ii) generating a tile-strategy signal indicative of assignment of the respective tiles based on a modulus of a numerical identifier associated with each of the available processing units and a numerical identifier associated with each of the tiles.

49. In a method according to claim 48, the further improvement comprising the steps of actuating said modulo means in instances in which
  i) data subject to access during execution of any such tile does not depend on that modified during execution of any other such tile,
  ii) no substantial quantity of data subject to any of read-type and write-type access by one such tile is also subject to any of read-type and write-type access by another such tile, and
  iii) re-use of data subject to any of read-type or write-type access by a processing unit executing a plurality of tiles is maximized, even in the presence of a change of a size of said iteration space.

50. In method according to claim 48, the further improvement comprising actuating said modulo means in response to a user-supplied signal.

51. In a method according to claim 44, the further improvement comprising providing selectively actuable wavefront means for executing the steps of
  i) generating boundary-representative signals dividing the iteration space along one or more of said indices, wherein data subject to access during execution of at least selected tiles depends on that modified during execution of another tile, and wherein those tiles have a dependency direction,
  ii) generating a tile-strategy signal indicative of a sequence of generation of the respective tiles in accord with that dependency direction.

52. In a method according to claim 51, the further improvement wherein said tile-strategy means includes means for actuating said wavefront means wherein data subject to access during execution of at least one such tile depends on that modified during execution of another such tile.

53. In method according to claim 51, the further improvement comprising actuating said wavefront means in response to a user-supplied signal.

54. In a method according to claim 44, the further improvement comprising providing selectively actuable modulo/wavefront means for executing the steps of i) generating boundary-representative signals to divide the iteration space in fixed-length increments along all of said indices, wherein data subject to access during execution of at least a selected tile depends on that modified during execution of one or more other tiles, and wherein said tiles have a dependency direction, and ii) generating a tile-strategy signal indicative of assignment of the respective tiles based on a modulus of a numerical identifier associated with each of the available processing units and a numerical identifier associated with each of the tiles, and on that dependency direction.

55. In a method according to claim 54, the further improvement comprising the steps of actuating said modulo/wavefront means in instances in which i) data subject to access during execution of at least one such tile depends on that modified during execution of one or more other such tiles, and ii) re-use of data subject to any of read-type or write-type access by a processing unit executing a plurality of tiles is maximized, even in the presence of a change of a size of said iterative space.

56. In a method according to claim 54, the further improvement comprising means for actuating said modulo/wavefront means in response to a user-supplied signal.

57. In a method according to claim 44, the further improvement comprising providing selectively actuable grab means for i) generating boundary-representative signals to divide the iteration space in fixed-length increments along all of said indices, and wherein data subject to access during execution of any tile does not depend on that modified during execution of any other tile, and ii) generating a tile-strategy signal indicative of a sequence of generation of the respective tiles, in response to said signalling for availability by said processing units, on a first-come-first-serve basis.

58. In a method according to claim 57, the further improvement wherein said tile-strategy means includes means for actuating said grab means i) to facilitate load-balancing among processing units executing said tiles, and in instances when ii) no substantial quantity of data is subject to any of read-type and write-type access by one such tile is also subject to any of read-type and write-type access by another such tile.

59. In a method according to claim 57, the further improvement comprising actuating said wavefront means in response to a user-supplied signal.

60. In a method according to claim 37, the further improvement comprising the steps of A. providing an affinity region signal representative of one or more iteration sequences that access the same data, B. generating one or more of i) a signal representative of an iteration space in which one or more tiled sequences within the affinity region are to be executed, ii) a tile-shape signal representative of one or more dimensions of a boundary-representative signal, iii) a tile-strategy signal indicative of at least one of a sequence and manner of assigning tiles to said processing units, and iv) a team signal representative of a set of processing units by which the tiled sequences within the affinity region are to be executed to minimize a transfer of a data subject to any of read-type and write-type access during such execution.

61. In method according to claim 60, the further improvement wherein said affinity region-build means includes means for defining said iteration space to encompass one or more of the iteration spaces of the tile sequences in said affinity region.

62. In a method according to claim 37, the improvement comprising the step of generating said boundary-representative signals so as to maximize a locality of data subject to access during execution of one or more corresponding tiles, and to minimize concentration for access to such data during such execution.

63. In a method for operating a compiler of the type for translating program signals representative of a program, including an iterative sequence, in source code format into a code sequence of instructions in an object code format suitable for loading for execution by a plurality of parallel digital data processing units, the improvement comprising the steps of responding to said iterative sequence in source code format for generating a tiled sequence of instructions representative thereof in object code format, and further responding to that iterative sequence and to zero, one or more user-specified signals for generating one or more signals representing a framework for generating boundaries for plural tiles over which said tiled sequence is to be executed by said plurality of parallel digital data processing units, each such tile comprising a portion less than a whole of an iteration space associated with said iterative sequence.

64. In a method according to claim 63, wherein said compiler includes dependency means for determining a dependency direction of said iterative sequence and for generating a signal representative thereof, the further improvement comprising responding to instructions in said iterative sequence and to said dependency direction-representative signal for generating signals representative of one or more indexes in said iteration space over which to execute said tiled sequence.

65. In a method according to claim 64, the further improvement comprising the steps of A. accepting signals representative of a user-specified indexing of said iteration space, and B. comparing said user-specified indexing signals with those generated by said method, and for generating a notification signal in the event of at least selected disagreement thereof.

66. In a method according to claim 64, the further improvement comprising generating one or more signals for use at runtime in optimizing parallel execution of said tiled sequence.

67. In a method according to claim 66, the further improvement comprising generating an affinity signal representative of a tile execution sequence that minimizes a transfer of data subject to any of read-type or write-type access during execution thereof in plural tiles.

68. In a method according to claim 66, the further improvement wherein said optimizing means comprises means for generating an affinity region signal representative of one or more iteration sequences that access the same data.

69. In a method according to claim 68, the further improvement comprising
   A. accepting signals representative of a user-specified affinity region signal, and
   B. comparing said user-specified affinity region signal with that generated by said method, and for generating a notification signal in the event of at least selected disagreement thereof.

70. In a method according to claim 66, the further improvement comprising generating a signal representative of an estimate of a processing cost associated with execution of said tiled sequence.

71. In a method according to claim 63, the improvement comprising replacing said iterative sequence in said source code format with an instruction representative of a call to a code-dispatching subroutine.

72. In a method according to claim 71, the improvement comprising executing said call-representative instruction for initiating execution of said tiled sequence by said processing units.

* * * * *